United States Patent [19]

Koden et al.

[11] Patent Number: 5,465,168
[45] Date of Patent: Nov. 7, 1995

[54] GRADATION DRIVING METHOD FOR BISTABLE FERROELECTRIC LIQUID CRYSTAL USING EFFECTIVE CONE ANGLE IN BOTH STATES

[75] Inventors: Mitsuhiro Koden, Nara; Akira Tagawa, Kashihara; Hitoshi Takeda, Tenri; Hirofumi Katsuse, Tenri; Makoto Shiomi, Tenri; Takaji Numao, Nara; Hiroshi Gouda, Tenri; Masayuki Katakami; Naofumi Kondo, both of Nara; Mikio Katayama, Ikoma, all of Japan

[73] Assignee: Sharp Kabushiki Kaisha, Osaka, Japan

[21] Appl. No.: 10,560

[22] Filed: Jan. 28, 1993

[30] Foreign Application Priority Data

| Jan. 29, 1992 | [JP] | Japan | 4-013767 |
| Jun. 30, 1992 | [JP] | Japan | 4-173495 |
| Jul. 13, 1992 | [JP] | Japan | 4-185186 |
| Jul. 27, 1992 | [JP] | Japan | 4-199841 |
| Nov. 19, 1992 | [JP] | Japan | 4-310553 |

[51] Int. Cl.⁶ .......... G02F 1/1343; G02F 1/13
[52] U.S. Cl. .......... 359/56; 359/100; 359/84; 345/97; 345/96
[58] Field of Search .......... 359/100, 104, 359/84, 56; 345/97, 96

[56] References Cited

U.S. PATENT DOCUMENTS

| 4,084,884 | 4/1978 | Raynes | 359/76 |
| 4,367,924 | 1/1983 | Clark et al. | 359/56 |
| 4,508,429 | 4/1985 | Nagae et al. | 359/56 |
| 5,113,273 | 5/1992 | Mochizuki et al. | 359/100 |
| 5,151,804 | 9/1992 | Vehulst et al. | 359/100 |
| 5,182,662 | 1/1993 | Mihara | 359/100 |
| 5,214,523 | 5/1993 | Nito et al. | 359/100 |
| 5,260,699 | 11/1993 | Lister et al. | 359/56 |
| 5,285,214 | 2/1994 | Bowry | 359/56 |
| 5,305,127 | 4/1994 | Konuma | 359/56 |
| 5,353,136 | 10/1994 | Escher et al. | 359/56 |
| 5,367,391 | 11/1994 | Johno et al. | 359/56 |

FOREIGN PATENT DOCUMENTS

| 0338675 | 10/1989 | European Pat. Off. . |
| 0455160 | 11/1991 | European Pat. Off. . |
| 62-200327 | 9/1987 | Japan . |
| 63-143529 | 6/1988 | Japan . |
| 63-142328 | 6/1988 | Japan . |
| 63-237035 | 10/1988 | Japan . |
| 64-38730 | 2/1989 | Japan . |

(List continued on next page.)

OTHER PUBLICATIONS

K. Hiroaka, "Electric-Field-Induced Tilt Angle and Devil's Staircase in SmCa* of an Antiferroelectric Chiral Smectic Liquid Crystal", *Japanese Journal of Applied Physics*, vol. 30, No. 10B, Oct. 15, 1991, pp. L1819–L1822.

"A Novel Surface-Stabilized Monostable Ferroelectric LCD", International Display Research Conference, Oct. 15–17, 1991 pp. 179–182.

*Primary Examiner*—William L. Sikes
*Assistant Examiner*—Kenneth Parker
*Attorney, Agent, or Firm*—David G. Conlin; Kevin J. Fournier

[57] ABSTRACT

A liquid crystal display includes a liquid crystal cell including a pair of substrates opposite to each other, each substrate having an electrode film and an orientation control layer thereon, and a ferroelectric liquid crystal filled between the substrates; and a pair of polarizing plates which are provided opposite to each other in the state of "cross nicol" on both sides of the liquid crystal cell; the ferroelectric liquid crystal being bistable in the liquid crystal cell, the polarizing plates being oriented in such a manner that one of their polarizing directions conforms to one of extinction positions of the ferroelectric liquid crystal under no electric field, the liquid crystal cell being applied with an alternating voltage for changing which has a positive portion which gives an apparent tilt angle from one stable state, and a negative portion which gives an apparent tilt angle relative to the other stable state, resulting in display with gray scale.

22 Claims, 33 Drawing Sheets liquid crystal : SF0731
cell thickness : 3μm
rubbing : parallel
orientation : C2

$\theta = 23.4°$
$\theta_m = 7.3°$

FOREIGN PATENT DOCUMENTS

| | | |
|---|---|---|
| 020055328 | 2/1990 | Japan . |
| 02238088 | 9/1990 | Japan . |
| 03152186 | 6/1991 | Japan . |
| 3242624 | 10/1991 | Japan . |
| 3243915 | 10/1991 | Japan . |
| WO-A9016007 | 12/1990 | WIPO . |

OFF    ON
CIU

OFF    OF
C2

CIU

C2

FIG.5(a)
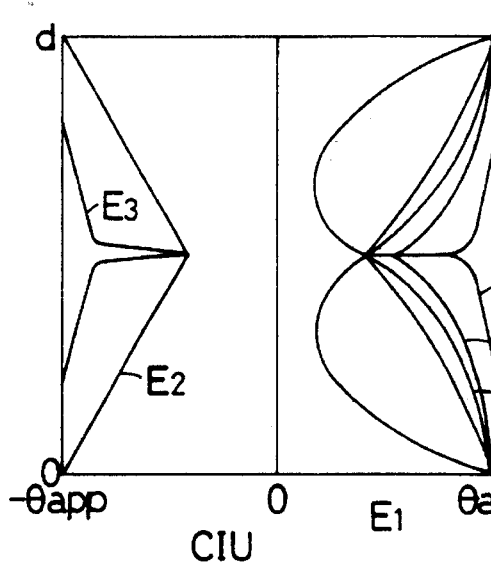
FIG.5(b)
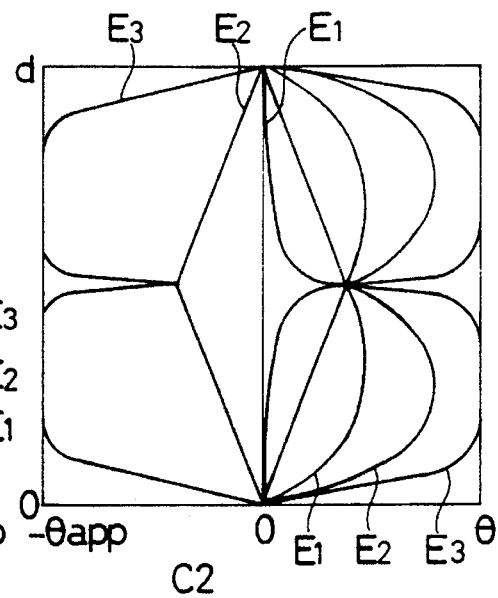
FIG.6(a)
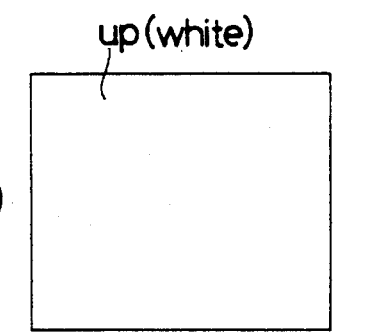
FIG.6(b)
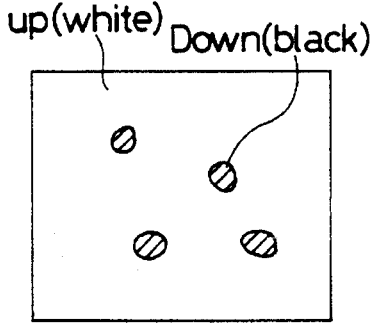
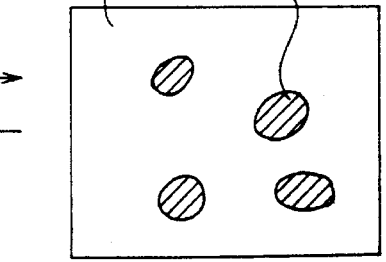

liquid crystal : SF0731 cell thickness : 3μm rubbing : parallel orientation : C2

FIG.14

| compound No. | compound constitution | phase transition temperature(°C) | | | | |
|---|---|---|---|---|---|---|
| | | K | Sc | SA | N | I |
| compound 1 | C8H17O–⟨F⟩–⟨⟩–OC8H17 | · 50 | (· 42) | – | · 63 | · |
| compound 2 | C10H21O–⟨F⟩–⟨⟩–OC8H17 | · 40 | · 52 | · 61 | · 65 | · |
| compound 3 | C5H11O–⟨⟩–⟨F,F⟩–⟨⟩–C8H17 | · 63 | · 93 | · 126 | · 127 | · |
| compound 4 | C8H17O–⟨⟩–⟨F,F⟩–⟨⟩–C8H17 | · 60 | · 109 | · 128 | – | · |
| compound 5 | C8H17–⟨⟩–⟨CN⟩–OCH2–CHO–C3H7 (S,S) | · 86 | – | – | – | · |
| compound 6 | C6H13–C*HO(CH3)–⟨⟩–⟨F,F⟩–⟨⟩–C8H17 (S) | · 47 | – | – | (· 42) | · | sowce voltage
drain voltage
transmitted light

Ton=5us sowce voltage
drain voltage
transmitted light

Ton=40us sowce voltage
drain voltage
transmitted light

Ton=100us

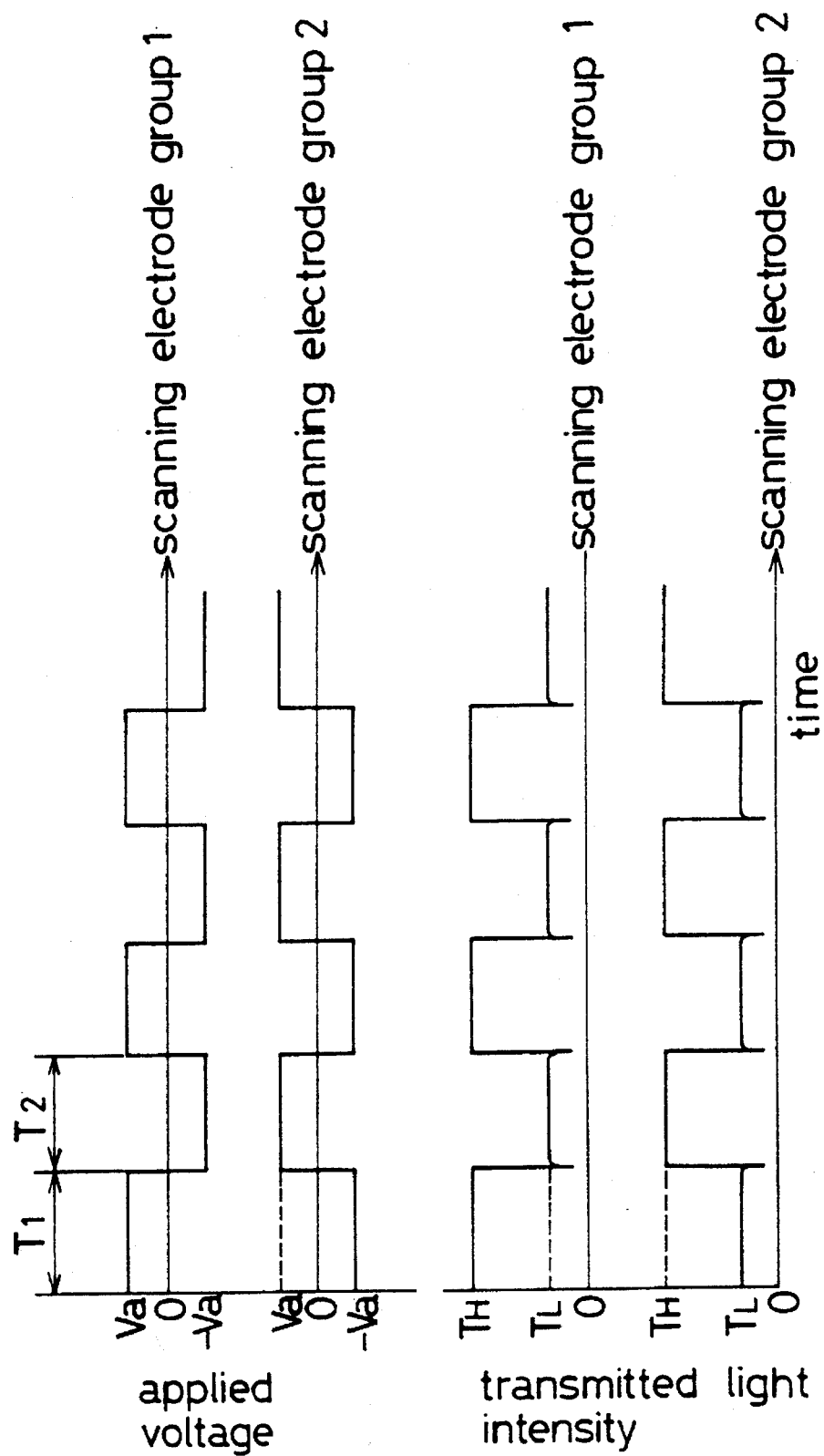

GRADATION DRIVING METHOD FOR BISTABLE FERROELECTRIC LIQUID CRYSTAL USING EFFECTIVE CONE ANGLE IN BOTH STATES

FIELD OF THE INVENTION

The present invention relates to a liquid crystal display and a method for driving the same, and more particularly to a ferroelectric liquid crystal display which can perform gradation display and a method for driving the safe.

DESCRIPTION OF THE RELATED ART

In place of a conventional nematic liquid crystal display, there has been developed a ferroelectric liquid crystal display which utilizes a ferroelectric liquid crystal showing such a phase as a chiral smectic C phase (For example, U.S. Pat. No. 4,367,942). Differently from the nematic liquid crystal display of an electric field effect type which utilizes the dielectric anisotropy of liquid crystal molecules, the ferroelectric liquid crystal display has a structure in which molecules perform switching so that the polarity of spontaneous polarization of the ferroelectric liquid crystal matches with that of an electric field.

The ferroelectric liquid crystal display utilizes a ferroelectric liquid crystal showing such a phase as a chiral smectic C phase, a chiral smectic F phase or a chiral smectic I phase. The configuration of liquid crystal molecules in these phases has a spiral structure. When the ferroelectric liquid crystals are held by a liquid crystal cell having a smaller thickness than a spiral pitch, the spiral structure is loosened. Consequently, there can be realized two regions, that is, a region where a liquid crystal molecule is inclined and stabilized at an angle Θ with a smectic layer normal and a region where the liquid crystal molecule is inclined and stabilized at the angle Θ in the opposite direction. When an electric field is applied in the direction of a cell thickness, the liquid crystal molecules and the direction of their spontaneous polarization can uniformly be aligned. The polarity of the electric field to be applied is switched so that switching between the two states can be performed. Referring to the ferroelectric liquid crystal in the cell, double refracted light is changed with the switching. Consequently, when the ferroelectric liquid crystal display is held between two polarizers, transmitted light can be controlled. In addition, even though the application of the electric field is stopped, the orientation of the liquid crystal molecule is kept in the same state as of prior to stopping the electric field application by the interface orientation control force between the cell and the liquid crystal. Consequently, memory effects can also be obtained. Furthermore, since the spontaneous polarization of the liquid crystal directly acts on the electric field, there can be obtained high speed response in the order of μsec.

As described above, the ferroelectric liquid crystal display is characterized by bistability, memory properties, high speed response and the like. In addition, the ferroelectric liquid crystal display has a very broad angle of visibility. However, there is a problem in that gradation display is hard to perform.

In order to perform the gradation display of the ferroelectric liquid crystal, various devices and methods have been proposed (for example, see U.S. Pat. Nos. 4,712,877 and 4,802,744). However, these devices and methods should be further improved for practical use.

SUMMARY OF THE INVENTION

The present invention provides a liquid crystal display comprising: a liquid crystal cell including a pair of substrates, each substrate having an electrode film and an orientation control layer thereon, and a ferroelectric liquid crystal filled between the substrates, and a pair of polarizing plates provided in the state of "cross nicol" on both sides of the liquid crystal cell; the ferroelectric liquid crystal being bistable in the liquid crystal cell, the polarizing plates being oriented in such a manner that one of their polarizing directions is consistent with to one of extinction positions of the ferroelectric liquid crystal under no electric field, the liquid crystal cell being applied with an alternating voltage for changing an apparent tilt angle angle of the ferroelectric liquid crystal depending on the applied voltage value, resulting in display with gray scale.

The present invention provides a method for driving a liquid crystal display comprising, a liquid crystal cell including a pair of substrates, one of the substrates providing pixel electrodes arranged in a matrix, scanning and signal electrodes and active elements for active matrix control of the pixel electrodes and an orientation control layer thereon, the remaining substrate providing an opposite electrode and an orientation control layer thereon, and a ferroelectric liquid crystal filled in the cell, the ferroelectric liquid crystal being bistable in the cell; and a pair of polarizing plates provided in the state of "cross nicol" on both sides of the liquid crystal cell, the polarizing plates being oriented in such a manner that one of their polarizing directions is consistent with one of extinction positions of the ferroelectric liquid crystal under no electric field, comprising the steps of: applying zero or positive voltages to the signal electrodes in synchronism to an ON operation of the active element responsive to a signal sent from the scanning electrode to form a first frame, and applying zero or negative voltages to the signal electrodes in synchronism to the ON operation of the active element to form a second frame, therewith controlling the magnitudes of the applied voltages to change an apparent tilt angle of the liquid crystal, and combining the first and second frames sequentially to display an image with gray scale.

The present invention provides a line sequential driving method for driving a liquid crystal display comprising: a liquid crystal cell including a pair of substrates, one of the substrate providing scanning electrodes and an orientation control layer thereon, the remaining substrate providing signal electrodes and an orientation control layer thereon, and a ferroelectric liquid crystal filled between the substrates, and a pair of polarizing plates provided in the state of "cross nicol" on both sides of the liquid crystal cell, the polarizing plates being oriented in such a manner that one of their polarizing directions is consistent with one of extinction positions of the ferroelectric liquid crystal under no electric field, comprising the steps of:

applying a positive voltage or a negative voltage to a series of electrode groups each comprising a predetermined number of the scanning and/or signal electrodes so that the voltages applied to adjacent electrode groups differ in polarity, to form a first frame, applying a voltage having polarity opposite to that in the first frame to each electrode group to form a second frame, therewith controlling magnitudes of the applied voltages to change an apparent tilt angle of the liquid crystal, and combining the first and second frames sequentially to display an image with gray scale.

Further, the present invention provides a line sequence driving method for driving an active matrix type liquid crystal display comprising, a liquid crystal cell including a pair of substrates, one of the substrates providing pixel electrodes arranged in a matrix, scanning and signal electrodes and active elements for active matrix control of the pixel electrodes and an orientation control layer thereon, the remaining substrate providing an opposite electrode and an orientation control layer thereon, and a ferroelectric liquid crystal filled in the cell; and a pair of polarizing plates provided in the state of "cross nicol" on both sides of the liquid crystal cell, the polarizing plates being oriented in such a manner that one their polarizing directions is consistent with one of extinction positions of the ferroelectric liquid crystal under no electric field, comprising the steps of: applying a positive voltage or a negative voltage to a series of electrode groups each comprising a predetermined number of the scanning and/or signal electrodes so that the voltages applied to adjacent electrode groups differ in polarity, to form a first frame, applying a voltage having polarity opposite to that in the first frame to each electrode group to form a second frame, therewith controlling magnitudes of the applied voltages to change an apparent tilt angle of the liquid crystal, and combining the first and second frames sequentially to display an image with gray scale.

A conventional ferroelectric liquid crystal may be used as the ferroelectric liquid crystal.

Preferably, the ferroelectric liquid crystal contains at least one of compounds represented by the representative formula (1):

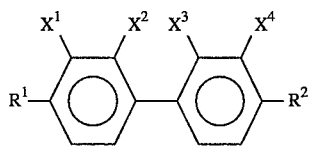

(where each of $R^1$ and $R^2$ denotes an alkyl or alkoxy group having a carbon number of 3 to 16 which is straight-chained or branched, and each of $X^1$, $X^2$, $X^3$ and $X^4$ denotes a hydrogen or halogen atom, at least one of which denotes a fluorine atom) or by the representative formula (2):

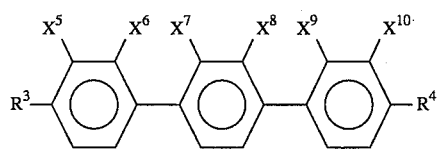

(where each of $R^3$ and $R^4$ denotes an alkyl or alkoxy group having a carbon number of 3 to 16 which is straight-chained or branched, and each of $X^5$, $X^6$, $X^7$, $X^8$, $X^9$ and $X^{10}$ denotes a hydrogen or halogen atom, at least one of which denotes a fluorine atom.)

It is desired that the ferroelectric liquid crystal satisfies the following relationship:

$$C \cdot V_{max} > 3 \cdot P_s \cdot S$$

where C is an electrostatic capacity of each pixel provided with the pixel electrode; $V_{max}$ is a maximum voltage applied to the pixel through the active element; S is an area of the pixel; and Ps is an absolute value of the spontaneous polarization of the ferroelectric liquid crystal.

A ferroelectric liquid crystal material, ZLI-5014-000 or ZLI-4237-000 (manufactured by Merck Co.) is used as the ferroelectric liquid crystal which easily satisfies the above relationship.

It is preferable that the ferroelectric liquid crystal is a short pitch ferroelectric liquid crystal having a spiral pitch shorter than a space between the substrates and a spiral structure to be loosened in the cell.

A material, FLC-6430 (manufactured by Hoffman-la Roche & CO., Switzerland) is used as the short pitch ferroelectric liquid crystal.

BRIEF DESCRIPTION OF THE DRAWINGS

FIGS. 5 (a) and 5 (b) are diagrams showing the state of change of the director profile when applying an electric field;

FIGS. 6 (a) and 6 (b) are typical diagrams of a polarizing microscope which shows the states of switching when applying a weak electric field;

FIG. 14 is a diagram showing the constitutions of liquid crystal compounds used in the embodiment of the present invention;

FIG. 29 is a waveform diagram for explaining a driving method according to the embodiment of the present invention;

DESCRIPTION OF THE PREFERRED EMBODIMENTS

A. Gradation Display in Bistable Ferroelectric Liquid Crystal Display

Figure 1:
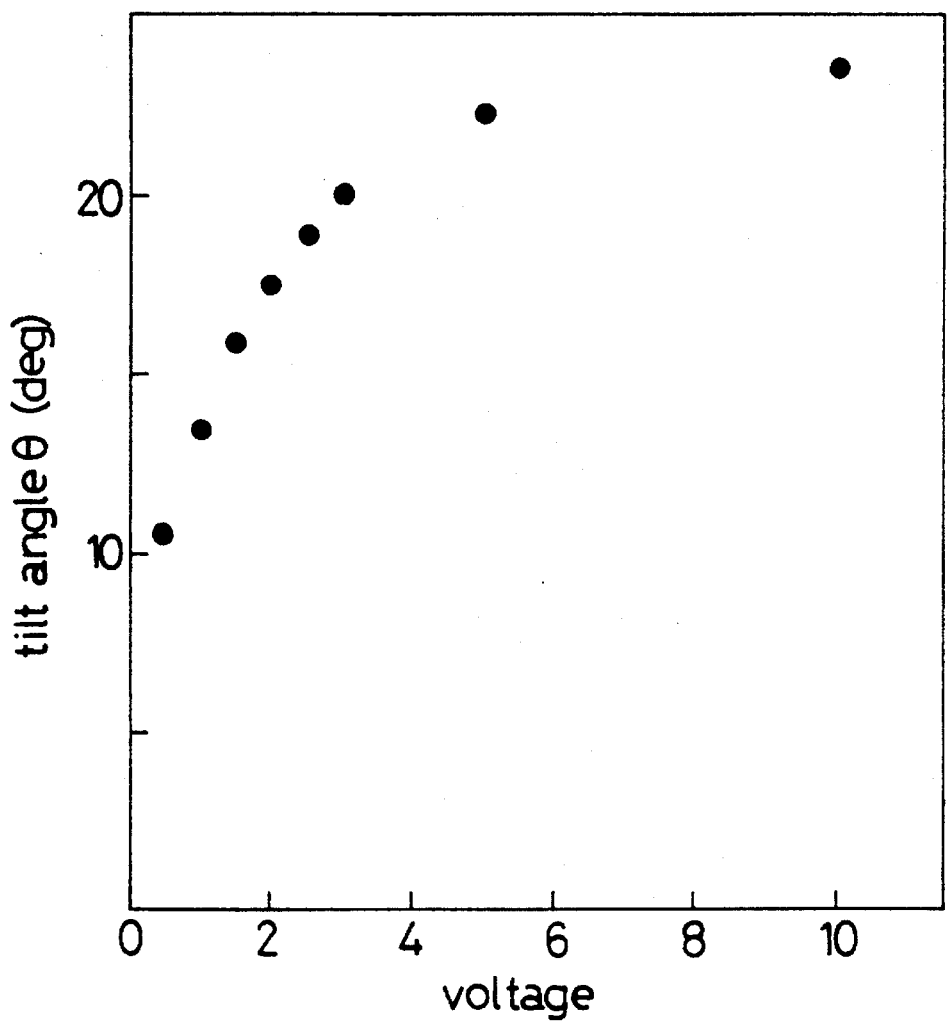
FIG. 1 is a diagram showing the relationship between a voltage and a tilt angle of a ferroelectric liquid crystal.
Figure 2A:
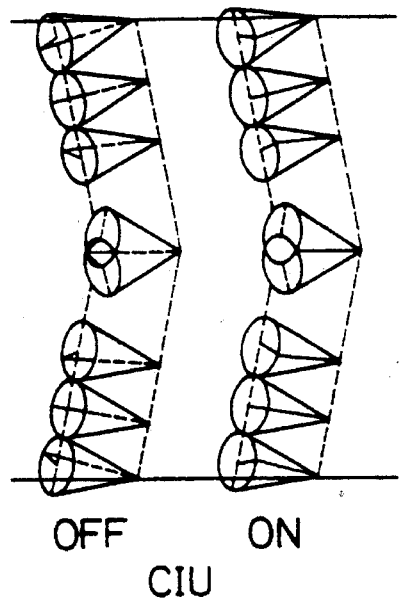
FIGS. 2 (a) and 2 (b) are diagrams showing models of molecular orientation of a ferroelectric liquid crystal display.
Figure 2B:
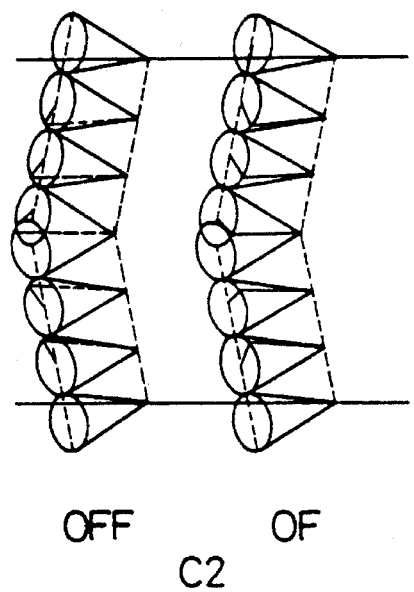

Referring to a liquid crystal display in which a cell having a small thickness is filled with a ferroelectric liquid crystal, there has been known the fact that spirals of the liquid crystal are loosened, and its two stable states appear and are switched by an electric field. In addition, it has generally been believed that an intermediate state between the two stable states cannot be created. However, the present inventors have found that the intermediate state can be created when applying the electric field. FIG. 1 shows the relationship between a tilt angle and a voltage which is measured by applying a square wave voltage having a frequency of 0.5 Hz to a ferroelectric liquid crystal cell. The tilt angle is half of an angle formed between extinction positions on both sides of a layer normal. As apparent from FIG. 1, when the voltage is made greater, the tilt angle is increased. In this case, it may be construed that the tilt angle is increased when the electric field is induced, or rather, it is reasonable that an apparent tilt angle is varied when director profile is changed in a liquid crystal cell. FIGS. 2 (a) and 2 (b) show examples of molecular arrangement in a ferroelectric liquid crystal display [M. Koden et al., The Second Japan Korea Joint Conference for Information Display, EID91-47 (1991)].

FIG. 2 (a) shows a model of C1U (C1 uniform) molecular orientation, and FIG. 2 (b) shows a model of C2 molecular orientation. The molecules of the ferroelectric liquid crystal are not always oriented uniformly from the upper face to the lower face of a cell. The molecules are regulated on a substrate interface and the joint face of a chevron layer, so that they cannot but be arranged with distortion.

Figure 3A:
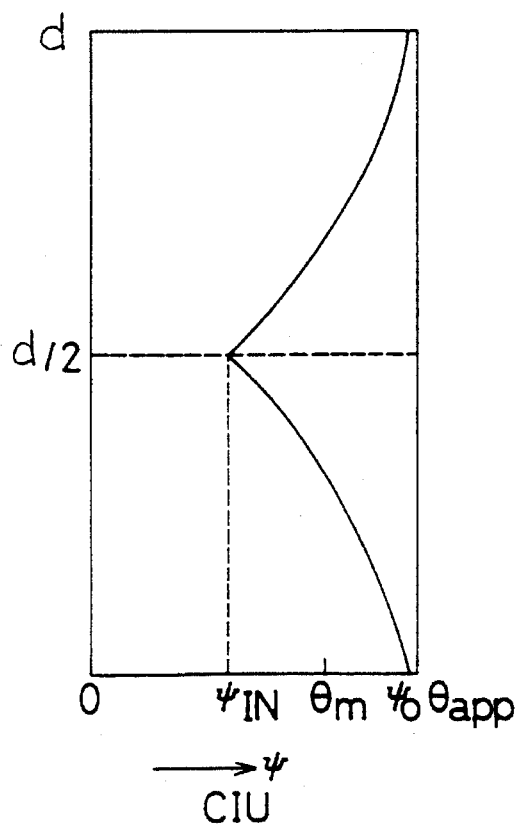
FIGS. 3 (a) and 3 (b) are diagrams showing the director profile of the ferroelectric liquid crystal display.
Figure 3B:
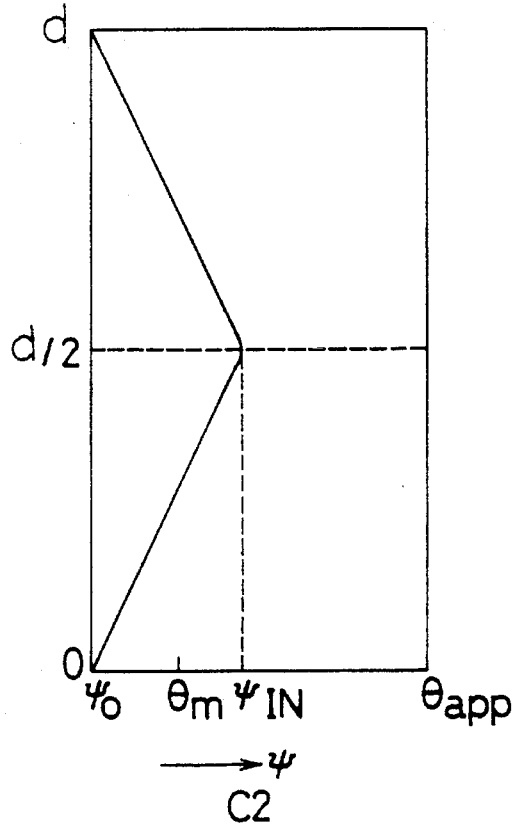
Figure 4:
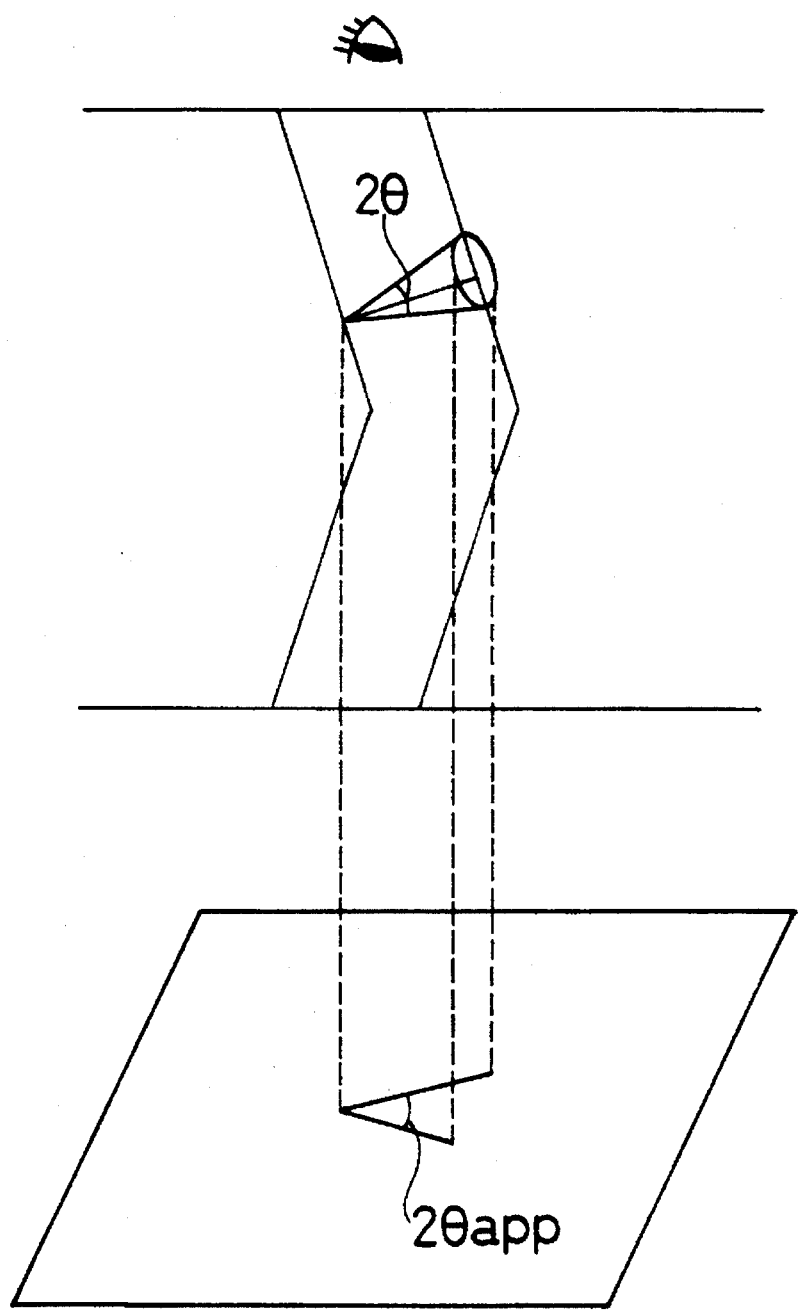
FIG. 4 is a diagram for explaining an apparent cone angle.

FIGS. 3 (a) and 3 (b) show director profiles of molecular arrangement. FIG. 3 (a) shows the director profile of the C1U orientation, and FIG. 3 (b) shows the director profile of the C2 orientation. An axis of ordinate denotes a cell thickness and an axis of abscissa denotes a twist angle (which is an angle formed with a layer normal of the director of liquid crystal molecules when the cell is seen from its upper face). $\Theta_{app}$ denotes an apparent cone angle (see FIG. 4). $\psi_0$ denotes a twist angle on the substrate interface. $\psi_{IN}$ denotes a twist angle on the joint face of the chevron layer.

In a state shown in FIG. 3, a memory angle $\Theta_m$ is generally obtained by the following formula:

$$\Theta_m(\psi_0+\psi_{IN})/2$$

FIGS. 5 (a) and 5 (b) show imaginary director profiles when electric fields E1, E2 and E3 are applied (E1<E2< E3) in the above-mentioned state. FIG. 5 (a) shows the director profile of C1U orientation, and FIG. 5 (b) shows the director profile of C2 orientation. When the electric field is increased, the director profile is changed. Consequently, an extinction position is changed. Thus, the results of FIG. 1 can be explained better.

In FIG. 1, the tilt angle is varied according to a voltage of 0.5 to 10 V. When the voltage is 0.5 V, the tilt angle is 10°. In this state, discontinuity is caused in a region where the voltage is 0 to 0.5 V. Measurement is performed on a region where the voltage is 0.5 V or less.

FIGS. 6 (a) and 6 (b) show the results of observation obtained by a polarizing microscope. As shown in FIG. 6 (a), when an electric field is applied, one of the stable states is sometimes switched into another one. In these regions, the extinction position is changed by about 1° to 4° according to the sign of the electric field. Therefore, it can be understood that a state in which domain inversion is not caused is the same as that obtained by applying the electric field El as shown in FIGS. 5 (a) and 5 (b). More specifically, molecules are not switched but the director profile is changed on three interfaces in the ferroelectric liquid crystal cell. It is supposed that the director profile is changed in a region where the domain inversion is caused in similar to the case where the electric field E2 is applied as shown in FIGS. 5 (a) and 5 (b). In case there are memory states Up and Down from the beginning, only an area ratio is changed therebetween as shown in FIG. 6 (b). In these regions, the extinction position is changed by about 1° to 4° according to the sign of the electric field. Therefore, it can be understood that the state in which the domain inversion is not caused is the same as that obtained by applying the electric field E1 as shown in FIGS. 5 (a) and 5 (b). More specifically, the molecules are not switched but the director profile is changed on the three interfaces in the ferroelectric liquid crystal cell. It is supposed that the director profile is changed in a region where the domain inversion is caused in similar to the case where the electric field E2 is applied as shown in FIGS. 5 (a) and 5 (b). Conversely, the application of a voltage of more than 0.5 V corresponds to that of the electric fields E2 and E3, so that the director profile is changed with switching on the interface. In this case, continuous gradation cannot be carried out.

In a region where two memory states exist as shown in FIG. 6 (b), a voltage of 0 to 10 V is applied while varying a frequency from 0.8 to 60 Hz so as to carry out observation by means of a polarizing microscope. As a result, the following is found. When the frequency is 10 Hz or less, a domain area is increased or decreased with the switching of polarity. When the frequency is more than 10 Hz, the boundary of two regions is not moved. In practice, when a square wave voltage having a frequency of more than 10 Hz is applied to the state of "white" as shown in FIG. 6 (a), a state shown in FIG. 6 (b) is not caused but brightness is changed.

Figure 7:
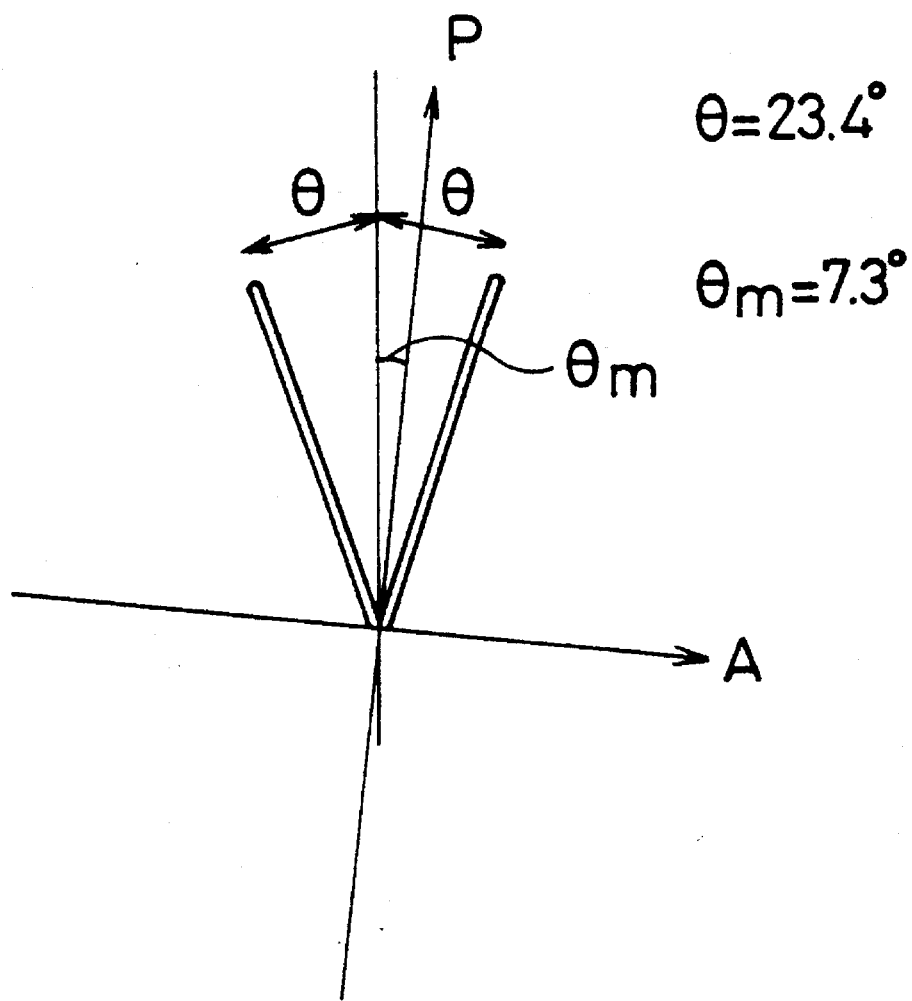
FIG. 7 is a diagram showing the arrangement of a ferroelectric liquid crystal display according to the present invention.
Figure 8:
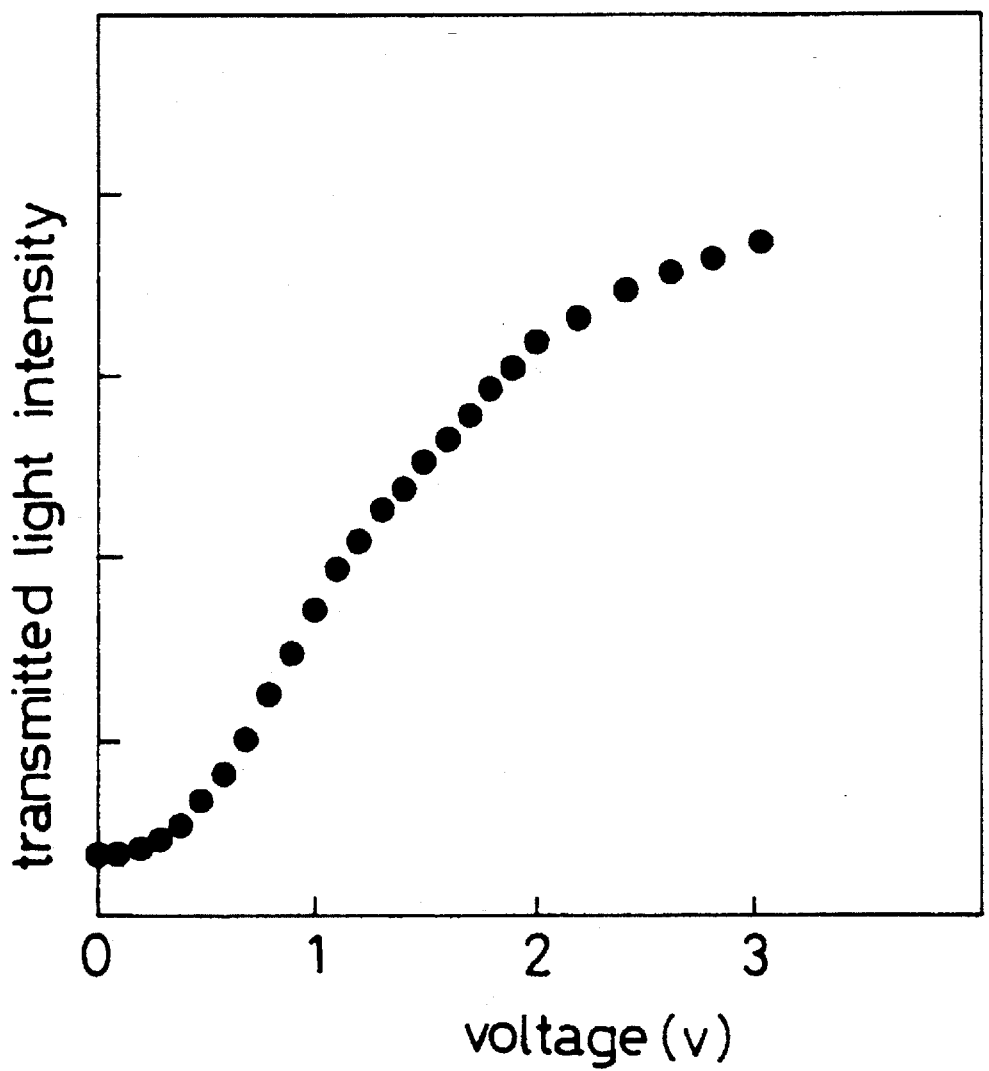
FIG. 8 is a diagram showing the relationship between an applied voltage and a transmitted light intensity in the ferroelectric liquid crystal display according to the present invention.

The polarizing direction of a polarizing plate placed in the state of "cross nicol" is caused to correspond to the extinction position of the ferroelectric liquid crystal display which takes one of the memory states by applying the electric field, and a square wave voltage having a frequency of 60 Hz is applied to measure a transmitted fight intensity. The memory angle of the ferroelectric liquid crystal display is half of an angle formed between two extinction positions and is always smaller than the tilt angle of a liquid crystal. This situation is shown in FIG. 7. A tilt angle Θ is half of an angle formed between the extinction positions when fully applying an electric field (±20 V). The results of measurement are shown in FIG. 8. As apparent from FIG. 8, when the voltage is made greater, the transmitted light intensity is continuously increased. It is found that infinite gradation can be carried out by utilizing these characteristics. In this case, a voltage waveform to be applied has no deflection to positive or negative. In addition, there can be obtained good reliability.

FIG. 8 shows an example in which a bistable ferroelectric liquid crystal display is used. A monostable ferroelectric liquid crystal display may be used.

It is desired that a voltage applied to the liquid crystal is an alternating voltage having no deflection to positive or negative. For example, a square wave voltage or a sine wave voltage can be used. In any case, gradation display can be realized according to the value of the voltage.

<Example 1>

An insulating film is formed on a pair of glass substrates on which a patterned ITO film is provided. Polyimide PSI-A-2001 (manufactured by Chisso Corporation, Japan) is spin-coated on the insulating film and rubbed. The glass substrates are stuck together to make a cell having a cell thickness of 2 μm in such a manner that their rubbing directions are parallel with each other. Ferroelectric liquid crystal compositions shown in Table 1 are injected into the cell under vacuum. This cell shows "bistable".

The characteristics of the liquid crystal compositions are also shown in Table 1.

The bistable ferroelectric liquid crystal cell thus prepared is set on a polarizing microscope. A tilt angle is measured by applying a rectangular wave voltage having a frequency of 0.5 Hz at 25° C. The tilt angle is defined by the half angle between two extinction positions when the square wave voltage is applied. The results are shown in FIG. 1. It is found that the tilt angle is changed according to the voltage. When the voltage is 0.5 V or less, the areas of two memory states are increased or decreased as shown in FIGS. 6 (a) and 6 (b), but the change of the tilt angle cannot be measured.

TABLE 1

$C_9H_{19}$—⬡—COO—⬡—$OC_6H_{13}$  28%

$C_8H_{17}O$—⬡—COO—⬡—$OC_6H_{13}$  14%

$C_8H_{17}O$—⬡—COO—⬡—$OC_4H_9$  14%

$C_8H_{17}O$—⬡—COO—⬡—$OC_8H_{17}$  12.5%

TABLE 1-continued $C_{10}H_{21}O$—⬡—COO—⬡—⬢—$C_5H_{11}$  9.5%

$C_8H_{17}O$—⬡(F)—⬡(F)—⬡—$C_8H_{17}$  8.5%

$C_5H_{11}O$—⬡(F)—⬡(F)—⬡—$C_8H_{17}$  8.5%

$C_8H_{17}$—⬡—⬡(CN)—$OCH_2$—*—[O—C(=O)]—*—$C_3H_7$  5%

Transition temperature (°C.)   $S_C^{58} S_A^{71} N^{87} I$
$P_S = -14.5$ nC/cm²   (25° C.)
$τ_C = 64$ μsec   (±5 V/μm, 25° C., 0→50%)

<Example 2>

The ferroelectric liquid crystal cell used in Example 1 is set on a polarizing microscope and is observed while applying a square wave voltage having a frequency of 60 Hz at 25° C. As a result, it is confirmed that no domain boundary is moved by applying the voltage.

<Example 3>

The ferroelectric liquid crystal cell used in Example 1 is set on a polarizing microscope. A transmitted light intensity is measured while applying a square wave voltage having a frequency of 60 Hz at 25° C. Results are shown in FIG. 8. It is found that the transmitted light intensity is continuously changed according to a voltage.

An example of a driving method which utilizes the most of such characteristics is an active matrix driving method. In particular, an active matrix driving method using a thin film transistor (TFT) is preferable, which will be confirmed in the next example.

<Example 4>

There will be described the structure of a cell on which thin film transistors (TFTs) are provided for the active matrix driving method.

Figure 9:
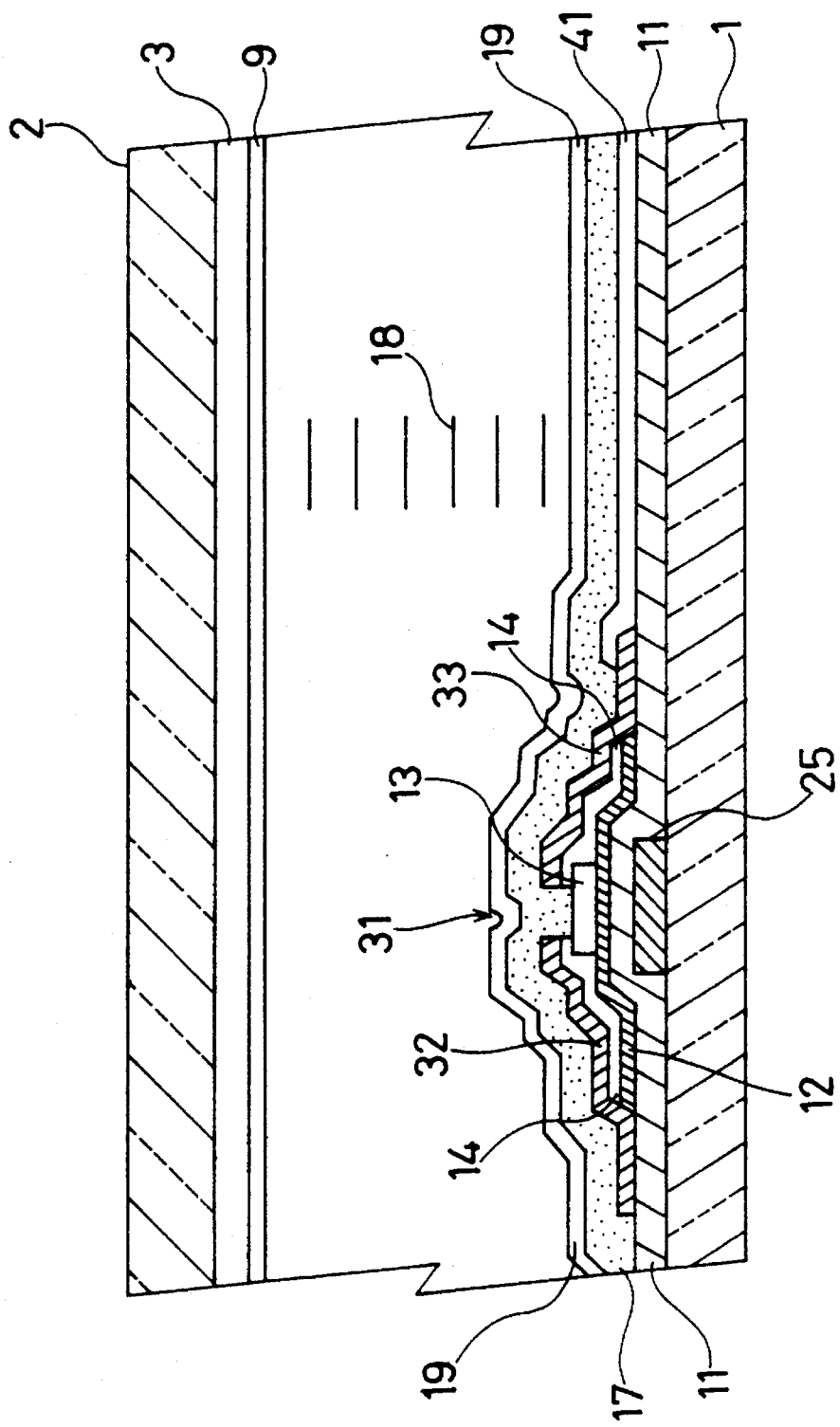
FIG. 9 is a partial section view of a liquid crystal display according to an embodiment of the present invention.

FIG. 9 is a partial section view of a liquid crystal display having the TFTs. A liquid crystal cell according to the present example comprises a pair of insulating substrates 1 and 2. A TFT 31 and a pixel electrode 41 are formed on the substrate 1. The TFT 31 includes a gate electrode 25, a gate insulating film 11, a channel layer 12, an etching stopper 13, a contact layer 14, a source electrode 32 and a drain electrode 33, and functions as a switching device. The pixel electrode 41 is electrically connected to the drain electrode 33. A protective film 17 is formed over the substrate on which the pixel electrode 41 is provided. An orientation film 19 is formed on the protective film 17. A transparent conductive film 3 and an orientation film 9 are formed on the substrate 2. The orientation films 9 and/or 19 are cured and then rubbed. After the substrates 1 and 2 is sealed, a liquid crystal layer 18 in which the ferroelectric liquid crystal compositions shown in Table 1 is vacuum-injected.

There will be described a method for preparing the cell.

A Ta film is formed on the substrate 1 by sputtering, and is then patterned to form 64 gate electrodes 25. A SiNx film, an a-Si semiconductor film and a SiNx film are continuously deposited as the gate insulating film 11, the channel layer 12 and the etching stopper 13 under vacuum by a plasma CVD method. Only the SiNx film 13 as a top layer is patterned so as to have a predetermined shape. An n+a-Si film to which phosphorus is added is formed as the contact layer 14. The n+a-Si film and the a-Si semiconductor film 12 are patterned so as to have predetermined shapes. Then, a Ti film is formed by sputtering. The Ti film and the n+a-Si film are patterned so as to have predetermined shapes. Consequently, the source electrode 32 and the drain electrode 33 are formed. An ITO film is formed by sputtering and patterned so as to have a predetermined shape. Consequently, the pixel electrode 41 is formed. A poly-Si semiconductor film may be used in place of the a-Si semiconductor film.

An ITO film is formed on the substrate 2 by sputtering.

A PVA film having a thickness of 0.03 μm is coated as the orientation films 9 and 19 onto the substrates 1 and 2, and is then cured. Only the substrate 2 is rubbed to obtain homogeneous alignment by means of rayon cloth. The substrates 1 and 2 are stuck together by means of an epoxy sealing material through a seal spacer having a thickness of 2 μm (not shown). The ferroelectric liquid crystal composition shown in Table 1 is introduced by vacuum injection and sealed between the substrates 1 and 2 by vacuum injection.

Examples of a method for treating the orientation films 9 and 19 include rubbing, oblique evapolation and the like. In case a liquid crystal display having a large screen is mass-produced, the rubbing method is more advantageous. Referring to the rubbing method, the orientation films are formed and then rubbed. Examples of the rubbing method include a parallel rubbing method (in which both substrates are rubbed and stuck together in such a manner that the rubbing directions are the same), an antiparallel rubbing method (in which both substrates are rubbed and stuck together in such a manner that the rubbing directions are opposite to each other), and a one-plate rubbing method (in which one of the substrates is rubbed). In case of the ferroelectric liquid crystal display according to the present invention, any orientation method can be used. Most preferably, there is used the one-plate rubbing method in which only a substrate having no TFT is rubbed. The reason is as follows. Firstly, the substrate having no TFT is evenet so that rubbing can easily be carried out uniformly. Secondly, when a substrate having the TFT is rubbed, static electricity is generated so that the characteristics of the TFT may be changed or dielectric breakdown between wirings may occur.

Figure 10:
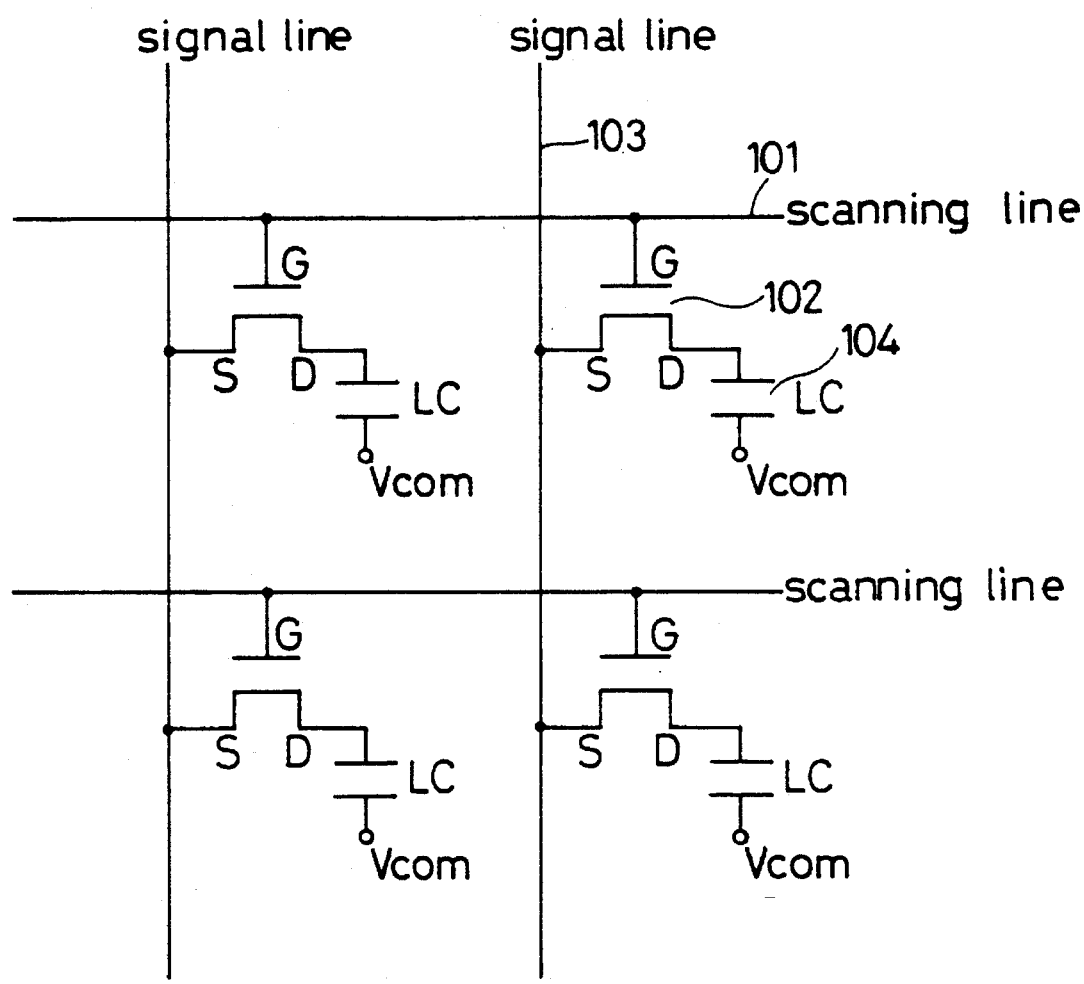
FIG. 10 is an equivalent circuit diagram showing a liquid crystal display which uses a thin film transistor (TFT) as an active element.

FIG. 10 shows an equivalent circuit of an active matrix type of liquid crystal display (TFT circuit) which uses a TFT. In case a liquid crystal is driven, a signal is sent through a scanning line 101 to apply an electric field to a gate electrode G and turn ON a TFT 102. When a signal is sent to a source electrode S through a signal line 103 synchronously, electric charges are stored in a liquid crystal 104 through a drain electrode D. Consequently, an electric field is generated. The electric field thus generated causes the liquid crystal to respond.

A specific example of the present invention will be described with the use of a liquid crystal display shown in FIG. 11 in which a ferroelectric liquid crystal is combined with an active matrix substrate. In the active matrix substrate, 1 scanning electrodes G1, G2, ... Gn–1, Gn, Gn+1, Gn+2, ..., Gi–1, G1 and k signal electrodes S1, S2, ..., Sm, Sm+1, .... Sk–1, Sk are formed in a matrix, and a TFT is arranged on each innersection. The gate and source electrodes of the TFT formed on each intersection are connected to the scanning and signal electrodes, respectively. P1/1, P1/2 ... P1/m, P1/m+1, ... Pn/1, Pn/2, ... Pn/m, Pn/m+1 and the like denote pixels (pixel electrodes) connected to the drain electrodes of the TFTs formed on the intersections. FIG. 12 shows driving waveforms for driving the liquid crystal display.

A signal is sent from the scanning electrode G1 to turn ON the TFT for a time $T_{ON}$. Synchronously, zero or positive voltages corresponding to necessary display are applied from the signal electrodes to the pixels (P1/1, P1/2, P1/m, P1/m+1, P1/k–1, P1/k and the like) connected to the scanning electrode G1. A signal is sent from the scanning electrode G2 to turn ON the TFT for the next time $T_{ON}$. Synchronously, a signal is sent from the signal electrode. In the same manner, the TFTs connected to the scanning electrodes are sequentially turned ON.

After signals are sent from all scanning electrodes (one frame is completed), a signal is sent from the scanning electrode G1 to turn ON the TFT for the time $T_{ON}$ again. Synchronously, zero or negative voltages corresponding to necessary display are applied from the signal electrodes to the pixels (P1/1, P1/2, P1/m, P1/m+1, P1/k–1, P1/k and the like) connected to the scanning electrode G1. A signal is sent from the scanning electrode G2 to turn ON the TFT for the next time $T_{ON}$. Synchronously, zero or negative signals are sent from the signal electrodes. In the same manner, the TFTs connected to the scanning electrodes are sequentially turned ON. FIG. 12 shows voltage waveforms to be applied to the pixels and the change of a transmitted light intensity. Positive and negative electric fields V1/1 having great values are alternately applied to the pixel P1/1 every frame. The display of the pixel P1/1 is brought into "white" by a transmitted light intensity T1/1. A voltage V1/2 applied to the pixel P1/2 is smaller than a voltage applied to the pixel P1/1 in the first 4 frames. For this reason, the display of the pixel P1/2 is darker than that of the pixel P1/1 and is half tone (gray) by a transmitted light intensity T1/2. In fifth and sixth frames, applied voltages are zero so that the display of the pixel P1/2 is brought into "black". Important is the relationship between a way to stick the polarizing plates together and the signs of an applied electric field. In FIG. 12, it is necessary to cause the polarizing direction of the polarizing plate to correspond to the extinction position in a memory state generated by applying a negative electric field (this state is "black"). In other words, if a positive voltage is applied and a voltage applied to the pixel is made zero, the display is brought into "white". Accordingly, two frames make a set in FIG. 12. A voltage value should be changed only in a first frame.

By combining a color filter, color display can be obtained.

The following advantages can be gained by using the ferroelectric liquid crystal display according to the present invention.

Firstly, in case the state of "black" is needed, the electric field is not applied to the liquid crystal so that high contrast can be obtained. Secondly, when the voltage applied to each pixel is varied, the transmitted light intensity can be changed. Consequently, display with gray scale can easily be carried out. Thirdly, since the polarity of an applied voltage is switched every frame, there can be obtained a liquid crystal display which has good reliability and no deflection of electrification. As compared with a device in which a nematic liquid crystal is combined with a TFT, a response speed is higher and an viewing angle is wider.

B. Ferroelectric Liquid Crystal Suitable for Gradation Display

Figure 11:
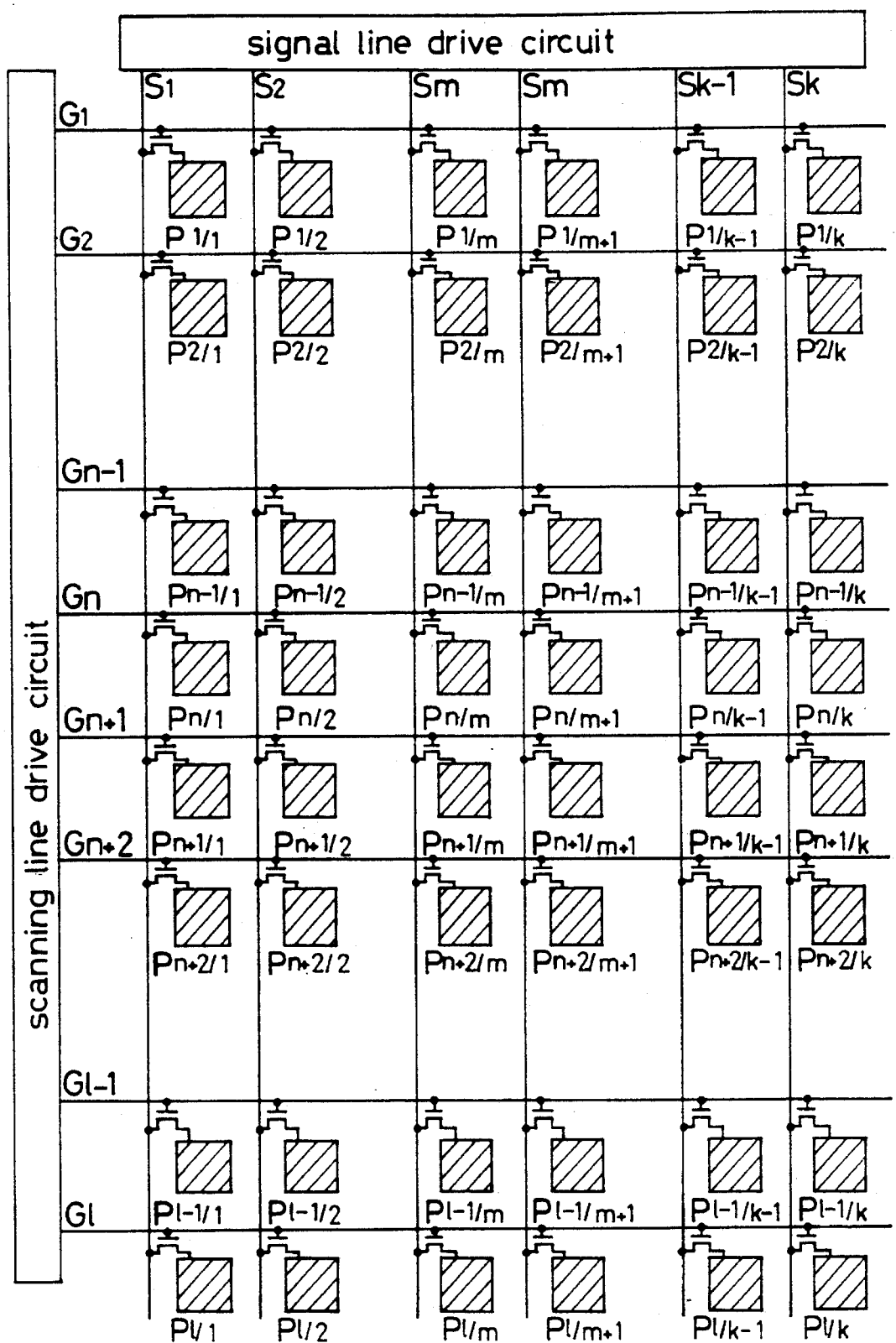
FIG. 11 is an equivalent circuit diagram showing the liquid crystal display according to the embodiment of the present invention.
Figure 12:
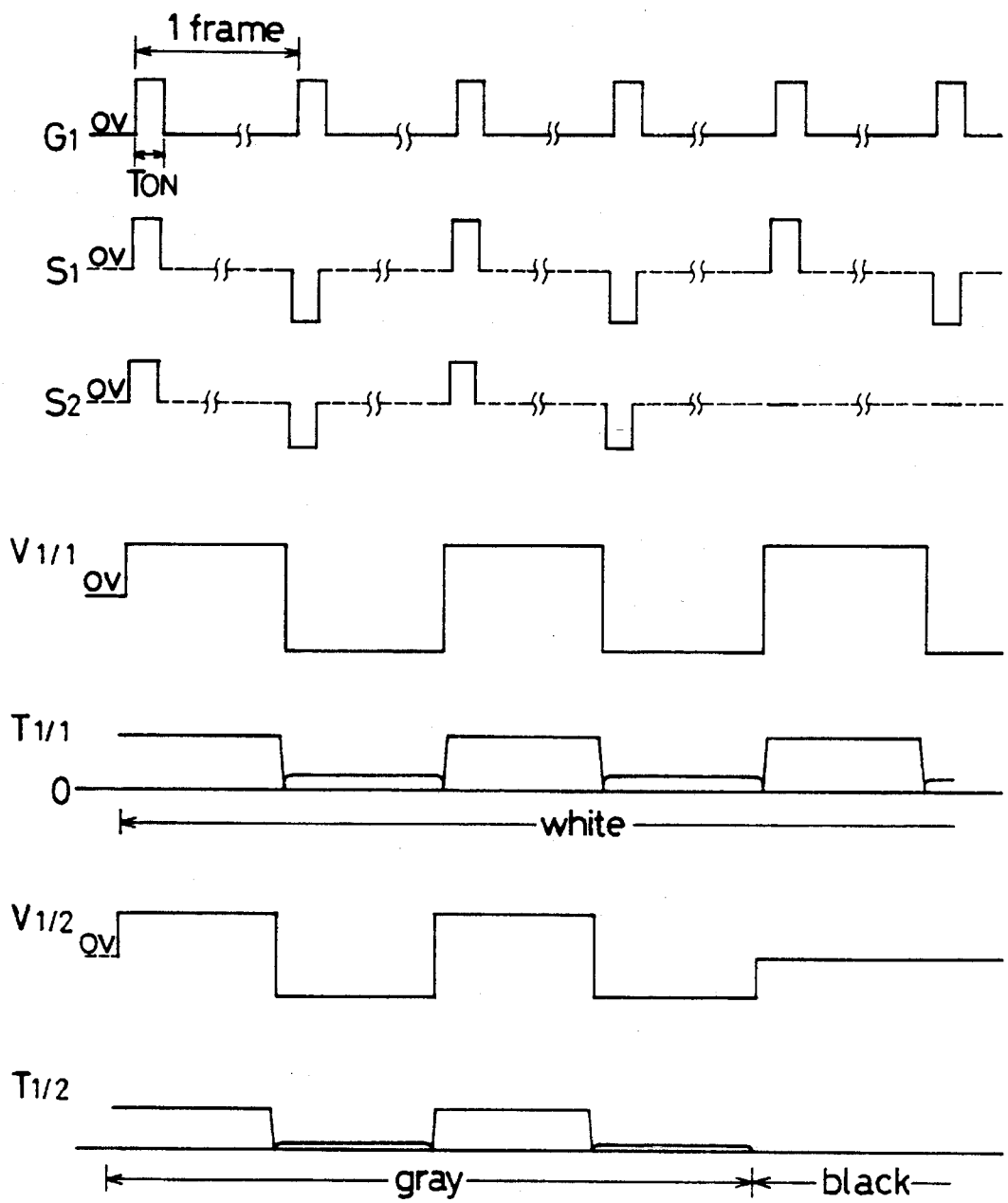
FIG. 12 is a driving waveform diagram of the liquid crystal display according to the embodiment of the present invention.

In the active matrix type display shown in FIG. 11, when an electric field is applied to a pixel (pixel electrode), an electric charge is simultaneously stored in the liquid crystal at the pixel. Consequently, even though the TFT of the pixel is turned OFF, the electric field is continuously applied to the liquid crystal.

However, since the electric charge is consumed by the movement of liquid crystal molecules after turning OFF the TFT (the change of director profile) or due to impurity ions contained in a liquid crystal composition, a charge voltage of the liquid crystal is dropped. Consequently, there cannot be obtained a transmitted light intensity corresponding to display. Accordingly, a liquid crystal material having small voltage drop, that is, a high charge retention is suitable for active matrix driving so as to obtain good display.

Examples of a ferroelectric liquid crystal to be used in the present invention include ZLI-5014-000 (manufactured by Merck Co., Ltd, England, electric capacity: 2.88 nF, spontaneous polarization: $-2.8$ nc/cm$^2$), ZLI-5014-100 (manufactured by Merck Co., Ltd, electric capacity: 3.19 nF, spontaneous polarization: $-20.0$ nc/cm$^2$), FELIX-008 (manufactured by Hoechst Aktiengeselishaft, Germany, electric capacity: 2.26 nF, spontaneous polarization: $-9.6$ nc/cm$^2$) and the like, which are put on the market.

Furthermore, the above-mentioned liquid crystals may be mixed together or may properly be mixed with the following compounds. It is not always necessary for the compounds to show a liquid crystal phase.

(a) a compound for adjusting the temperature range of the liquid crystal phase of a composition to be prepared, (b) an optically active compound which shows or induces great spontaneous polarization in a ferroelectric liquid crystal phase, and (c) an optically active compound for adjusting the spiral pitch of the liquid crystal phase of a composition to be prepared.

A cell using various ferroelectric liquid crystal materials is driven by the TFT circuit shown in FIGS. 10 and 11. As a result, the present inventors have got the following knowledge of voltage drop ($\Delta$Voff) applied over the liquid crystal the moment the gate electrode is turned OFF.

(1) When the pulse width of a voltage applied to the gate electrode is increased, $\Delta$Voff is decreased.

(2) When there is used a ferroelectric liquid crystal material having small spontaneous polarization and small frequency dispersion of a dielectric constant, $\Delta$voff is made smaller.

The foregoing can be explained with the use of the following model. If a gate pulse is fully long, liquid crystal molecules move to a stable position while a gate is turned ON, and do not need to move any longer after the gate is turned OFF. However, if the gate pulse is short, the liquid crystal molecules do not reach the stable position while the gate is turned ON. For this reason, the liquid crystal molecules tend to move to the stable position even though the gate is turned OFF. However, the ferroelectric liquid crystal molecules have spontaneous polarization. Consequently, when the liquid crystal molecules move, electric charges held between electrodes are necessarily consumed. As a result, voltage drop is caused. Seen in this light, the above-mentioned phenomenon can be understood better. More specifically, when the spontaneous polarization is small, an amount of electric charges to be consumed is small even though the liquid crystal molecules move after the gate is turned OFF. Consequently, it can be understood that $\Delta$Voff is small. Thus, when the gate pulse is short, $\Delta$Voff is the difference between an amount of electric charges held by pixels and that of electric charges consumed by the movement of the liquid crystal molecules after the gate is turned OFF. The amount of electric charges consumed by the movement of the liquid crystal molecules after the gate is turned OFF is correlated with the spontaneous polarization and the area of a pixel. Accordingly, it is necessary to design a device and materials in order to satisfy the following relationship in such a manner that $\Delta$Voff is restricted within the range in which no trouble is substantially caused:

$$C \cdot Vmax > 3 \cdot Ps \cdot S$$

where C is a capacity of the ferroelectric liquid crystal on each pixel, Vmax is a maximum voltage applied to the liquid crystal through the TFT, S is an area of the pixel, and Ps is a absolute value of the spontaneous polarization of the ferroelectric liquid crystal.

The present inventors have measured a dielectric constant by applying an alternating voltage having each frequency to a cell which uses various ferroelectric liquid crystal materials. As a result, they have confirmed that the dielectric constant is changed depending on the frequency when a ferroelectric liquid crystal material having great spontaneous polarization is used, and that the dielectric constant is lowered in a region where the frequency is more than 10 kHz. When seen as follows, the foregoing can be understood. More specifically, if the ferroelectric liquid crystal molecules move in such a manner that the direction of spontaneous polarization conforms to than of an applied voltage, a high dielectric constant can be obtained. In a high-frequency region, however, their movement cannot be carried out so that the dielectric constant is lowered. When the spontaneous polarization is greater, the dielectric constant is greatly changed. When the spontaneous polarization is reduced to some extent, the change of the dielectric constant is not marked. More specifically, the dielectric constant of the ferroelectric liquid crystal material having great spontaneous polarization is small in the high-frequency region and is great in a low-frequency region. In case TFT driving is performed, the dielectric constant of the ferroelectric liquid crystal material is small because the frequency of the time for applying a voltage by turning ON the gate is high, and the dielectric constant is great because the frequency of the time for holding the voltage after turning OFF the gate is low. For this reason, when the dielectric constant is changed after the gate is turned OFF, the voltage applied to the ferroelectric liquid crystal material by turning ON the gate is reduced. Therefore, it is preferred to use a ferroelectric liquid crystal material having spontaneous polarization of 5 nC/cm$^2$ or less in order to prevent the voltage from being reduced. Such a ferroelectric liquid crystal material is not affected by the lowering of the dielectric constant in the high-frequency region.

<Example 5>

An insulating film is formed on a pair of glass substrates on which a patterned ITO film is provided. Polyimide PSI-A-2001 (manufactured by Chisso Corporation) is spin-coated on the insulating film and rubbed. The glass substrates are stuck together at a cell thickness of 2 μm in such a manner that their rubbing directions are parallel with each other. Ferroelectric liquid crystal materials shown in Table 2 are vacuum injected to prepare ferroelectric liquid crystal cells (Nos. 1–3).

Figure 13:
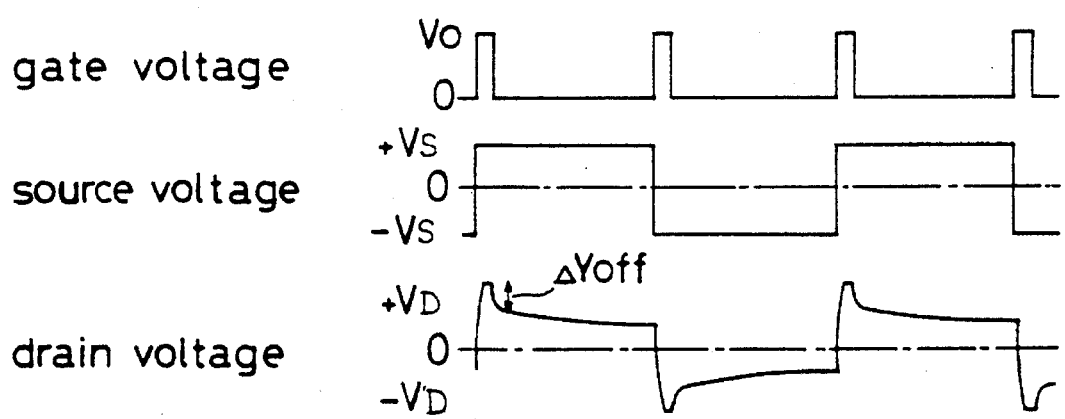
FIG. 13 is a driving waveform diagram according to the embodiment of the present invention.

On both sides of the ferroelectric liquid crystal cell thus prepared are provided a pair of polarizing plates of which polarizing directions are caused to correspond to one of extinction positions. The ferroelectric liquid crystal cell is connected to a MOS transistor. Gate and source signals shown in FIG. 13 are provided. Such a manner, driving characteristics are evaluated. A gate pulse width is 40 μs, and the cycle of a source signal is 30 Hz. Results are shown in Table 2.

TABLE 2

Evaluation Results of Ferroelectric Liquid Crystal Cell Characteristics

| Liquid Crystal | Spontaneous Polarization | Electrostatic Capacity | $\Delta V$off |
|---|---|---|---|
| ZLI-5014-000 | $-2.8$ nC/cm$^2$ | No frequency dependence | Small lowering |
| ZLI-5014-100 | $-20.0$ nC/cm$^2$ | Frequency dependence | Rapid lowering |
| FELIX-008 | $-9.6$ nC/cm$^2$ | Frequency dependence | Rapid lowering |

$\theta p = 15°$ ($\theta p$: pretilt angle)

A maximum voltage Vmax which can be applied by a source driver is 10 V. A pixel area S of the ferroelectric liquid crystal cell is 1 cm$^2$. An electrostatic capacity C of each pixel and spontaneous polarization Ps of each ferroelectric liquid crystal material are shown in Table 3. In this case, C·Vmax and 3·Ps·S of each cell are shown in Table 3. Referring to cells No.2 and No.3, C·Vmax is smaller than 3·Ps·S, and the electrostatic capacity is changed depending on the frequency when the absolute value of the spontaneous polarization is more than 5 nC/cm$^2$. For this reason, $\Delta V$off is great. Referring to a cell No.1, C·Vmax is greater than 3·Ps·S, and the dielectric constant is not changed depending on the frequency when the absolute value of the spontaneous polarization is 5 nC/cm$^2$ or less. Consequently, $\Delta V$off is small.

TABLE 3

Relationship between C · Vmax and 3 · Ps · S of Ferroelectric Liquid Crystal Cell

| cell. No. | liquid crystal | C(nF) | C Vmax$^{(1)}$ | Ps(nC/cm$^2$) | 3 Ps S$^{(2)}$ | (1)< >(2) |
|---|---|---|---|---|---|---|
| 1 | ZLI-5014-000 | 2.88 | 28.8 | $-2.8$ | $-8.4$ | (1) > (2) |
| 2 | ZLI-5014-100 | 3.19 | 31.9 | $-20.0$ | $-60.0$ | (1) < (2) |
| 3 | FELIX-008 | 2.26 | 22.6 | $-9.6$ | $-28.8$ | (1) < (2) |

<Example 6>

The cell having TFTs in Example 4 is used. In place of the liquid crystal composition in Example 4, a ferroelectric liquid crystal having small spontaneous polarization, for example, ZLI-5014-000 manufactured by Merck Co., Ltd. is injected.

In the same manner as in Example 4, the cell is driven.

Voltages having waveforms shown in FIG. 12 are applied to the scanning and signal electrodes. While a gate pulse is turned ON, an information signal is provided to a pixel electrode through the TFT and an electric charge is stored in the liquid crystal. Thereby, an electric field is generated. The liquid crystal moleculars move to transmit light according to the electric field thus generated. As shown in FIG. 12, consequently, there can be obtained half tone display corresponding to the information signal which is provided.

In this case, electric field lowering $\Delta V$off generated on the liquid crystal layer is small because the ferroelectric liquid crystal having small spontaneous polarization is used. Accordingly, there can be obtained display corresponding to the information signal which is provided. Thus, good TFT driving can be carried out.

Voltage drop caused by impurity ions contained in the liquid crystal composition or the like can be controlled by using a ferroelectric liquid crystal composition of which resistivity is great. Compounds represented by the following representative formulas (1) and (2) do not contain an ester group, a cyano group, a nitrogen-containing heterocycle and the like, so that their resistivities are great. By using a ferroelectric liquid crystal composition containing plenty of these compounds, the voltage drop can be reduced. As described above, the voltage drop is caused by the change of director profile of liquid crystal molecules for a time corresponding to the response speed of the ferroelectric liquid crystal composition, that is, tens to hundreds μsecs. The reason is as follows. More specifically, since a time width required for turning ON the TFT is smaller than a time width required for the response of the ferroelectric liquid crystal composition, the director profile of the liquid crystal molecules is continuously changed even though the TFT is turned OFF. Consequently, the spontaneous polarization is switched so that a current flows. In order to reduce the current generated by the director profile, it is necessary to decrease an amount of electric charges consumed by the swithing of the spontaneous polarization by using a ferroelectric liquid crystal composition of which spontaneous polarization has a small absolute value, or to cause a time width required for changing the director profile of the liquid crystal molecules to approach a time width required for turning ON the TFT by using a ferroelectric liquid crystal composition of which response speed is high. A ferroelectric liquid crystal composition containing plenty of compounds represented by the representative formulas (1) and (2) has a low viscosity. In addition, even though the absolute value of spontaneous polarization is small, a response speed is high. Consequently, it is possible to reduce voltage drop caused by the change of director profile of liquid crystal molecules by using these ferroelectric liquid crystal compositions.

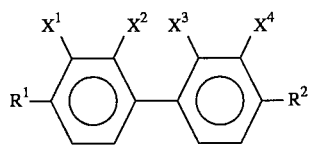

Representative Formula (1)

(where each of $R^1$ and $R^2$ denotes an alkyl or alkoxy group having a carbon number of 3 to 16 which is straight-chained or branched, and each of $X^1$, $X^2$, $X^3$ and $X^4$ denotes a hydrogen or halogen atom, at least one of which denotes a fluorine atom.)

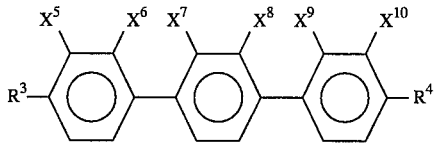

Representative Formula (2)

(where each of $R^3$ and $R^4$ denotes an alkyl or alkoxy group having a carbon number of 3 to 16 which is straight-chained or branched, and each of $X^5$, $X^6$, $X^7$, $X^8$, $X^9$ and $X^{10}$ denotes a hydrogen or halogen atom, at least one of which denotes a fluorine atom.)

Specific examples of $R^1$, $R^2$ and $R^3$, $R^4$ contained in the compounds represented by the representative formulas (1) and (2) are as follows.

—$(CH_2)_2$—$CH_3$
—$(CH_2)_3$—$CH_3$
—$(CH_2)_4$—$CH_3$
—$(CH_2)_5$—$CH_3$
—$(CH_2)_6$—$CH_3$
—$(CH_2)_7$—$CH_3$
—$(CH_2)_8$—$CH_3$
—$(CH_2)_9$—$CH_3$
—$(CH_2)_{10}$—$CH_3$
—$(CH_2)_{11}$—$CH_3$
—$(CH_2)_{12}$—$CH_3$
—$(CH_2)_{13}$—$CH_3$
—$(CH_2)_{14}$—$CH_3$
—$(CH_2)_{15}$—$CH_3$
—$CH(CH_3)_2$
—$CH(CH_3)$—$C_2H_5$
—$CH(CH_3)$—$(CH_2)_2$—$CH_3$
—$CH(CH_3)$—$(CH_2)_3$—$CH_3$
—$CH(CH_3)$—$(CH_2)_4$—$CH_3$
—$CH(CH_3)$—$(CH_2)_5$—$CH_3$
—$CH(CH_3)$—$(CH_2)_6$—$CH_3$
—$CH(CH_3)$—$(CH_2)_7$—$CH_3$
—$CH(CH_3)$—$(CH_2)_8$—$CH_3$
—$CH(CH_3)$—$(CH_2)_9$—$CH_3$
—$CH(CH_3)$—$(CH_2)_{10}$—$CH_3$
—$CH(CH_3)$—$(CH_2)_{11}$—$CH_3$
—$CH(CH_3)$—$(CH_2)_{12}$—$CH_3$
—$CH(CH_3)$—$(CH_2)_{13}$—$CH_3$
—$CH_2$—$CH(CH_3)_2$
—$CH_2$—$CH(CH_3)$—$C_2H_5$
—$CH_2$—$CH(CH_3)$—$(CH_2)_2$—$CH_3$
—$CH_2$—$CH(CH_3)$—$(CH_2)_3$—$CH_3$
—$CH_2$—$CH(CH_3)$—$(CH_2)_4$—$CH_3$
—$CH_2$—$CH(CH_3)$—$(CH_2)_5$—$CH_3$
—$CH_2$—$CH(CH_3)$—$(CH_2)_6$—$CH_3$
—$CH_2$—$CH(CH_3)$—$(CH_2)_7$—$CH_3$
—$CH_2$—$CH(CH_3)$—$(CH_2)_8$—$CH_3$
—$CH_2$—$CH(CH_3)$—$(CH_2)_9$—$CH_3$
—$CH_2$—$CH(CH_3)$—$(CH_2)_{10}$—$CH_3$
—$CH_2$—$CH(CH_3)$—$(CH_2)_{11}$—$CH_3$
—$CH_2$—$CH(CH_3)$—$(CH_2)_{12}$—$CH_3$
—O—$(CH_2)_2$—$CH_3$
—O—$(CH_2)_3$—$CH_3$
—O—$(CH_2)_4$—$CH_3$
—O—$(CH_2)_5$—$CH_3$
—O—$(CH_2)_6$—$CH_3$
—O—$(CH_2)_7$—$CH_3$
—O—$(CH_2)_8$—$CH_3$
—O—$(CH_2)_9$—$CH_3$
—O—$(CH_2)_{10}$—$CH_3$
—O—$(CH_2)_{11}$—$CH_3$
—O—$(CH_2)_{12}$—$CH_3$
—O—$(CH_2)_{13}$—$CH_3$
—O—$(CH_2)_{14}$—$CH_3$
—O—$(CH_2)_{15}$—$CH_3$
—$OCH(CH_3)_2$
—$OCH(CH_3)$—$C_2H_5$
—$OCH(CH_3)$—$(CH_2)_2$—$CH_3$
—$OCH(CH_3)$—$(CH_2)_3$—$CH_3$
—$OCH(CH_3)$—$(CH_2)_4$—$CH_3$
—$OCH(CH_3)$—$(CH_2)_5$—$CH_3$
—$OCH(CH_3)$—$(CH_2)_6$—$CH_3$
—$OCH(CH_3)$—$(CH_2)_7$—$CH_3$
—$OCH(CH_3)$—$(CH_2)_8$—$CH_3$
—$OCH(CH_3)$—$(CH_2)_9$—$CH_3$
—$OCH(CH_3)$—$(CH_2)_{10}$—$CH_3$
—$OCH(CH_3)$—$(CH_2)_{11}$—$CH_3$
—$OCH(CH_3)$—$(CH_2)_{12}$—$CH_3$
—$OCH(CH_3)$—$(CH_2)_{13}$—$CH_3$
—$OCH_2$—$CH(CH_3)_2$
—$OCH_2$—$CH(CH_3)$—$C_2H_5$
—$OCH_2$—$CH(CH_3)$—$(CH_2)_2$—$CH_3$
—$OCH_2$—$CH(CH_3)$—$(CH_2)_3$—$CH_3$
—$OCH_2$—$CH(CH_3)$—$(CH_2)_4$—$CH_3$
—$OCH_2$—$CH(CH_3)$—$(CH_2)_5$—$CH_3$
—$OCH_2$—$CH(CH_3)$—$(CH_2)_6$—$CH_3$
—$OCH_2$—$CH(CH_3)$—$(CH_2)_7$—$CH_3$
—$OCH_2$—$CH(CH_3)$—$(CH_2)_8$—$CH_3$
—$OCH_2$—$CH(CH_3)$—$(CH_2)_9$—$CH_3$
—$OCH_2$—$CH(CH_3)$—$(CH_2)_{10}$—$CH_3$
—$OCH_2$—$CH(CH_3)$—$(CH_2)_{11}$—$CH_3$
—$OCH_2$—$CH(CH_3)$—$(CH_2)_{12}$—$CH_3$

The following are specific examples of the frame constitution of a compound represented by the representative formula (1) which contains the above-mentioned $R^1$ and $R^2$.

-continued
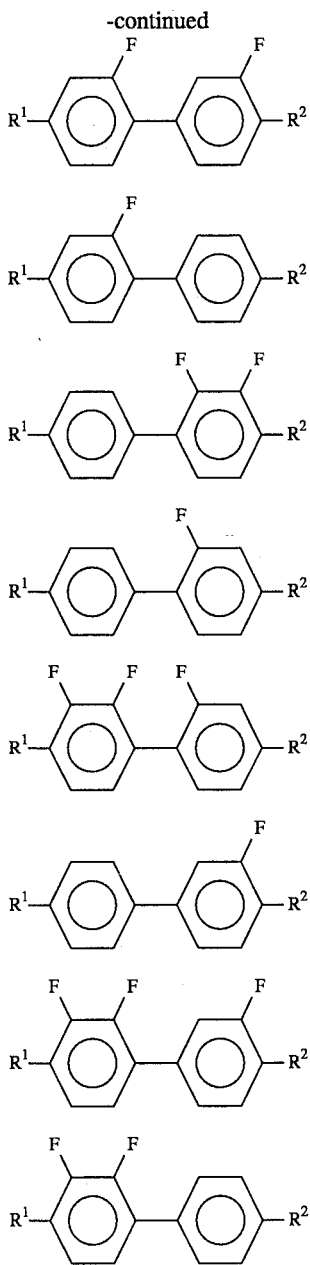
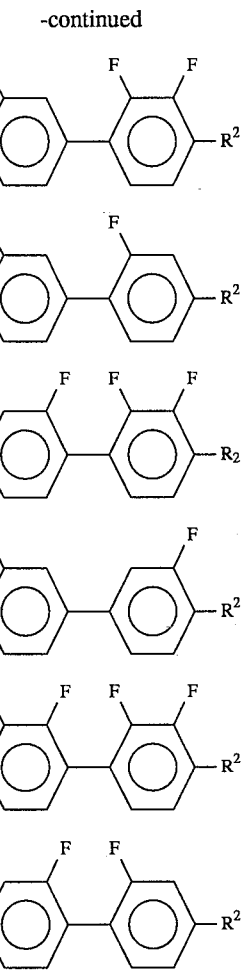
The following are specific examples of the frame constitution of a compound represented by the representative formula (2).
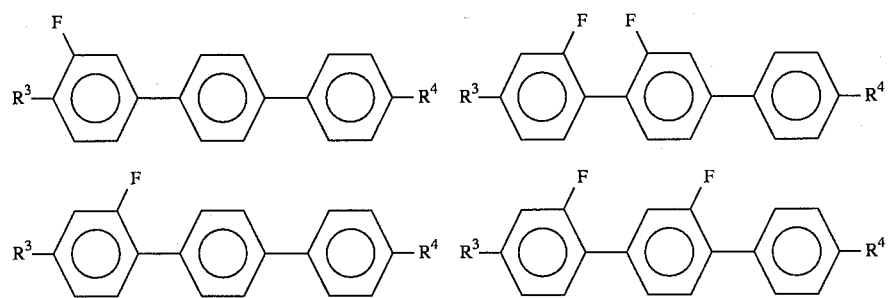

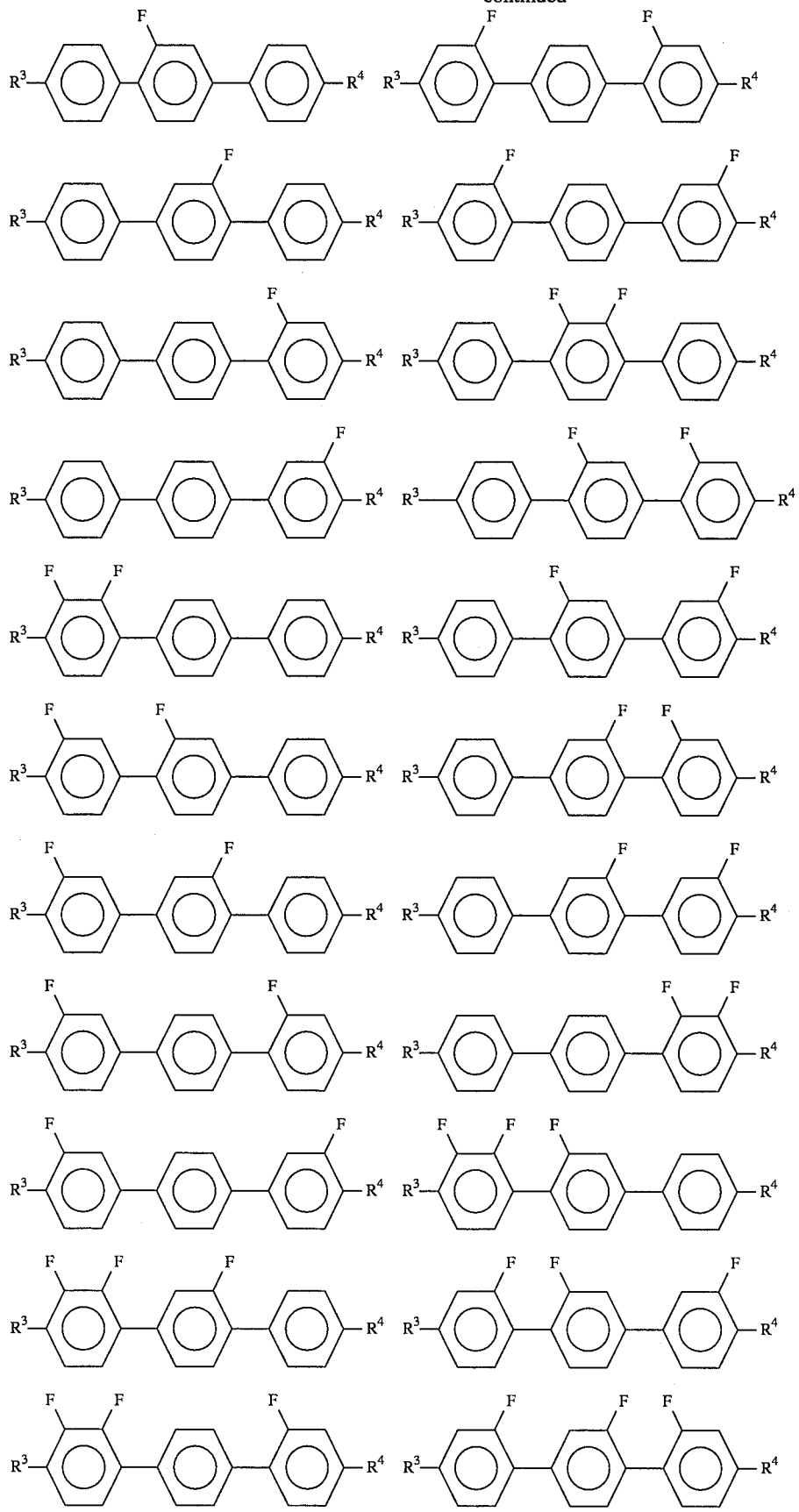

-continued
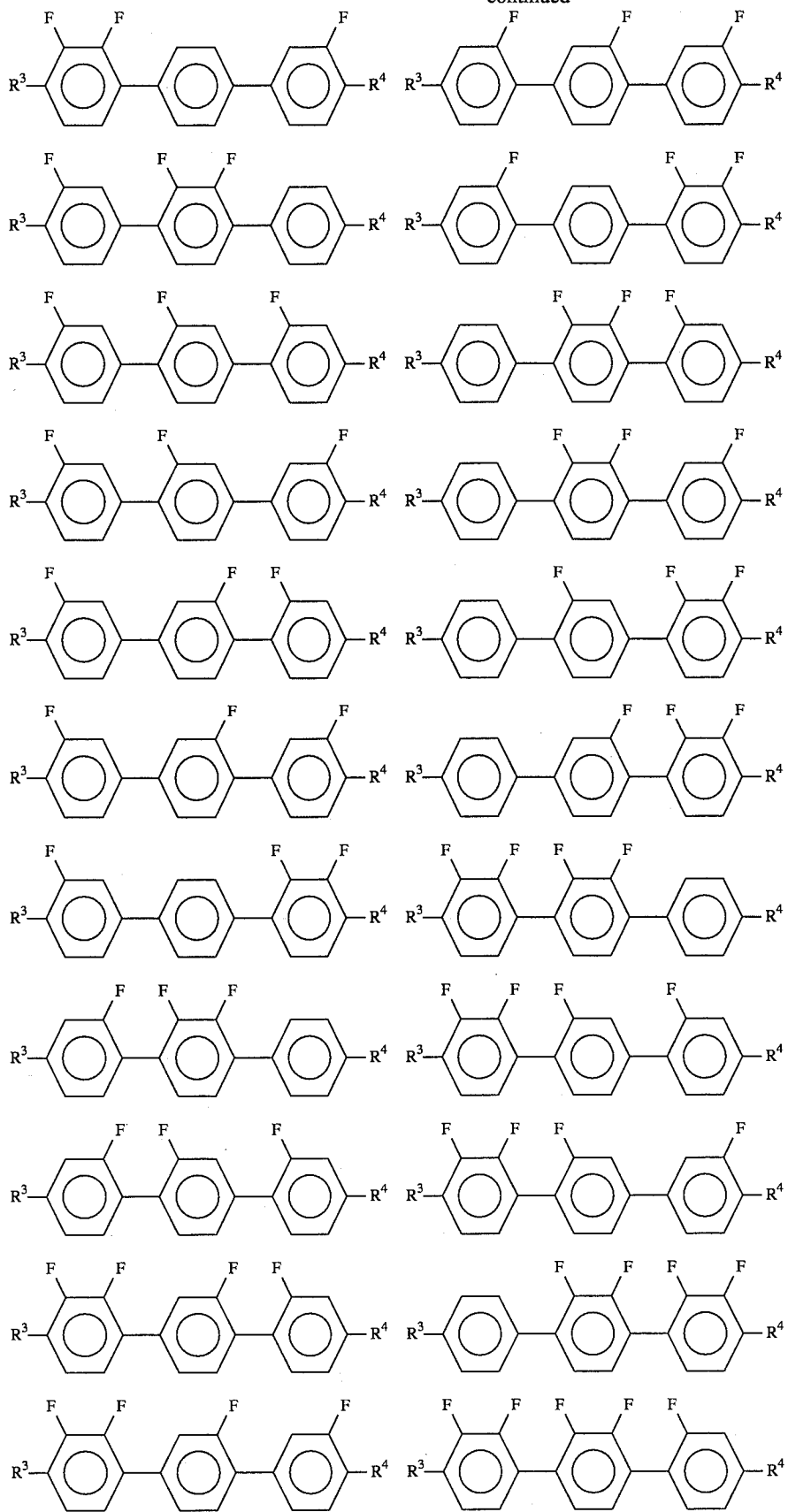

-continued

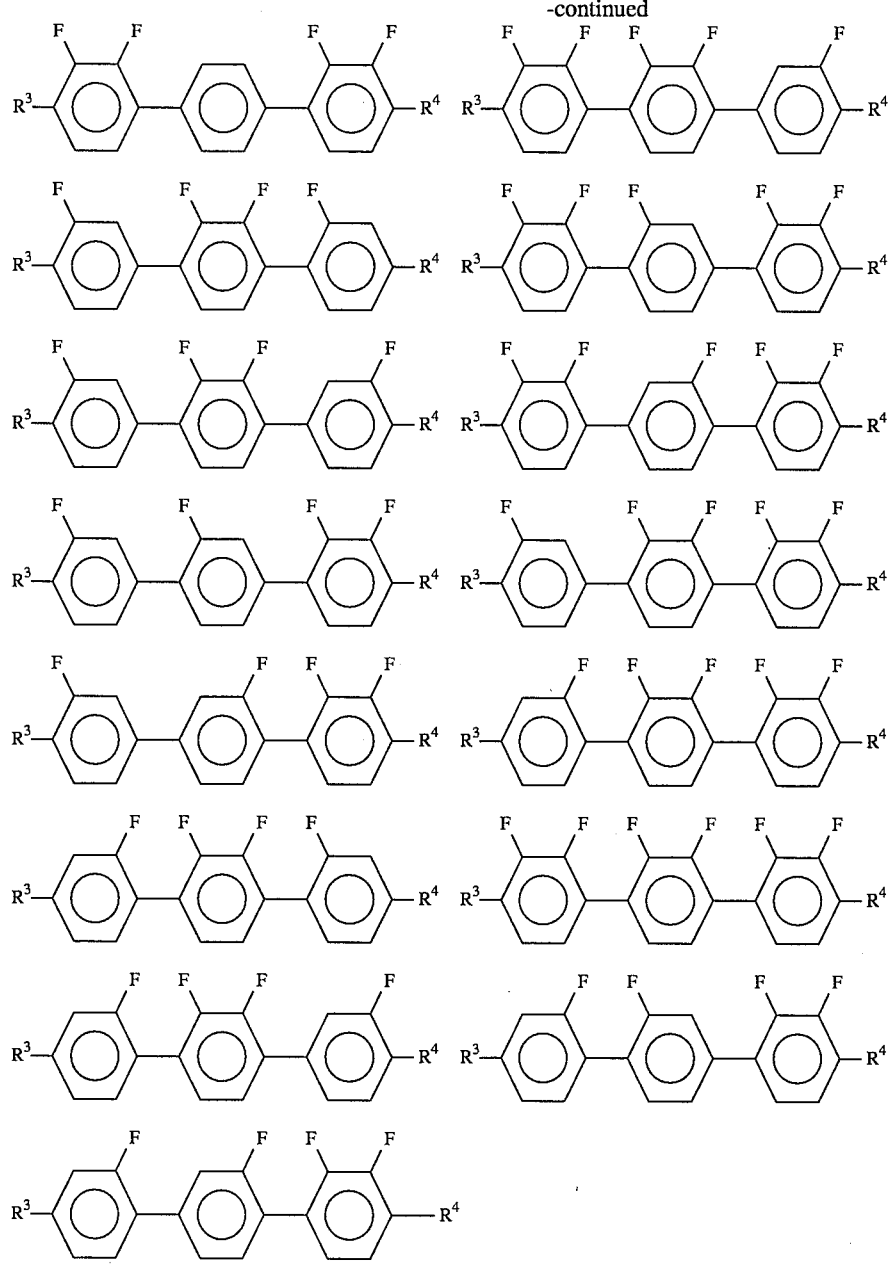

<Example 7>

Ferroelectric liquid crystal compositions shown in Table 4 are prepared by using compounds shown in FIG. 14. A phase transition temperature is also shown in Table 4. Compositions 1, 2 and 3 indicate INAC phase sequence, and indicate a smectic C phase around a room temperature.

TABLE 4

| compo-sition No. | compound No. (weight %) | | | | | | phase transition temperature(°C.) |
|---|---|---|---|---|---|---|---|
| | 1 | 2 | 3 | 4 | 5 | 6 | K ScS$_A$ N I |
| 1 | 24.5 | 24.5 | 24.5 | 24.5 | 2.0 | | · <RT · 66 · 81 · 86 · |
| 2 | 24.5 | 24.5 | 24.5 | 24.5 | | 2.0 | · <RT · 69 · 81 · 87 · |
| 3 | 22.5 | 22.5 | 22.5 | 22.5 | | 10.0 | · <RT · 67 · 79 · 85 · |

An insulating film is formed on a pair of glass substrates on which a patterned ITO film is provided. Polyimide PSI-A-2101 (manufactured by Chisso Corporation) is spin-coated on the insulating film and rubbed. The glass substrates ace stuck together at an interval of 2 μm in such a manner that their rubbing directions are parallel with each other. Compositions 1, 2 and 3 shown in Table 4 are vacuum-injected to prepare ferroelectric liquid crystal displays 1, 2 and 3.

The spontaneous polarization, tilt angle and memory angle of the liquid crystal display are measured. Their results are shown in Table 5. The tilt angle is the half angle between extinction positions in two stable states when applying enough voltage for a liquid crystal to respond with the liquid crystal display provided between polarizing plates in the state of "cross nicol". The memory angle is an angle formed between extinction positions in two stable states when applying no voltage.

TABLE 5

| Composition No. | Spontaneous Polarization (nC/cm$^2$) | Tilt Angle θ(°) | Memory Angle 2θ(°) | Response Speed (μsec) |
| --- | --- | --- | --- | --- |
| 1 | −1.5 | 24 | 23 | 170 |
| 2 | <0.5 | 23 | 19 | 147 |
| 3 | 1.1 | 24 | 20 | 172 |

As shown in Table 5, although the spontaneous polarization of each liquid crystal composition is 2 or less, a response speed is 200 μsecs or less.

Figure 15:
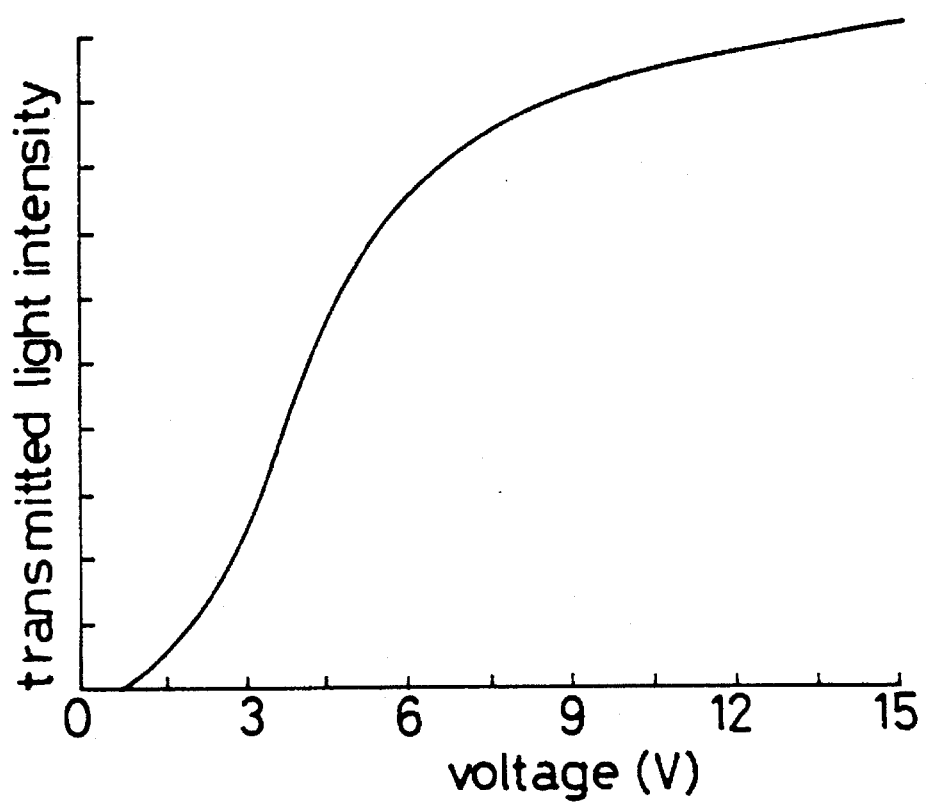
FIG. 15 is a characteristic chart showing an applied voltage and a transmitted light intensity according to the embodiment of the present invention.
Figure 16:
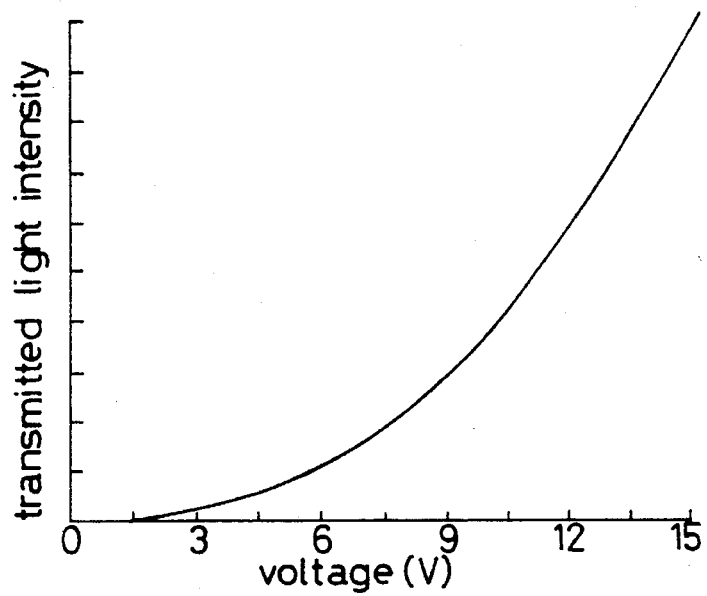
FIGS. 16 (a) and 16 (b) are characteristic charts showing an applied voltage and a transmitted light intensity according to the embodiment of the present invention.
Figure 16:
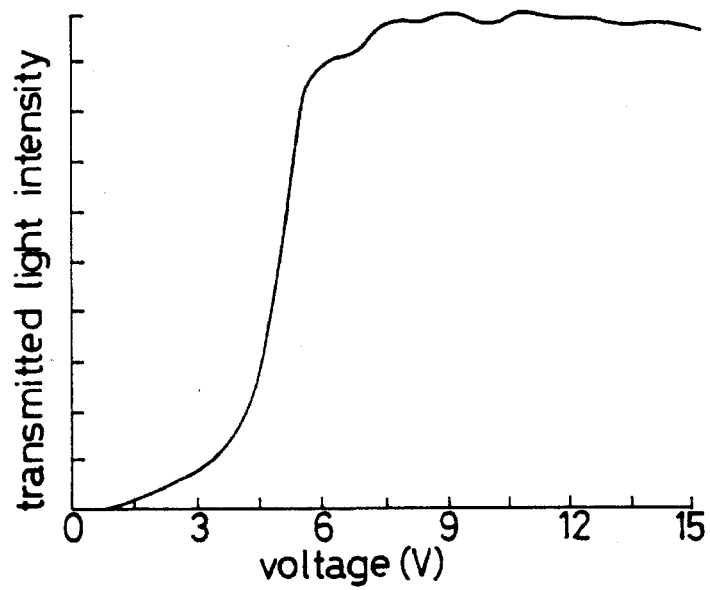
Figure 17:
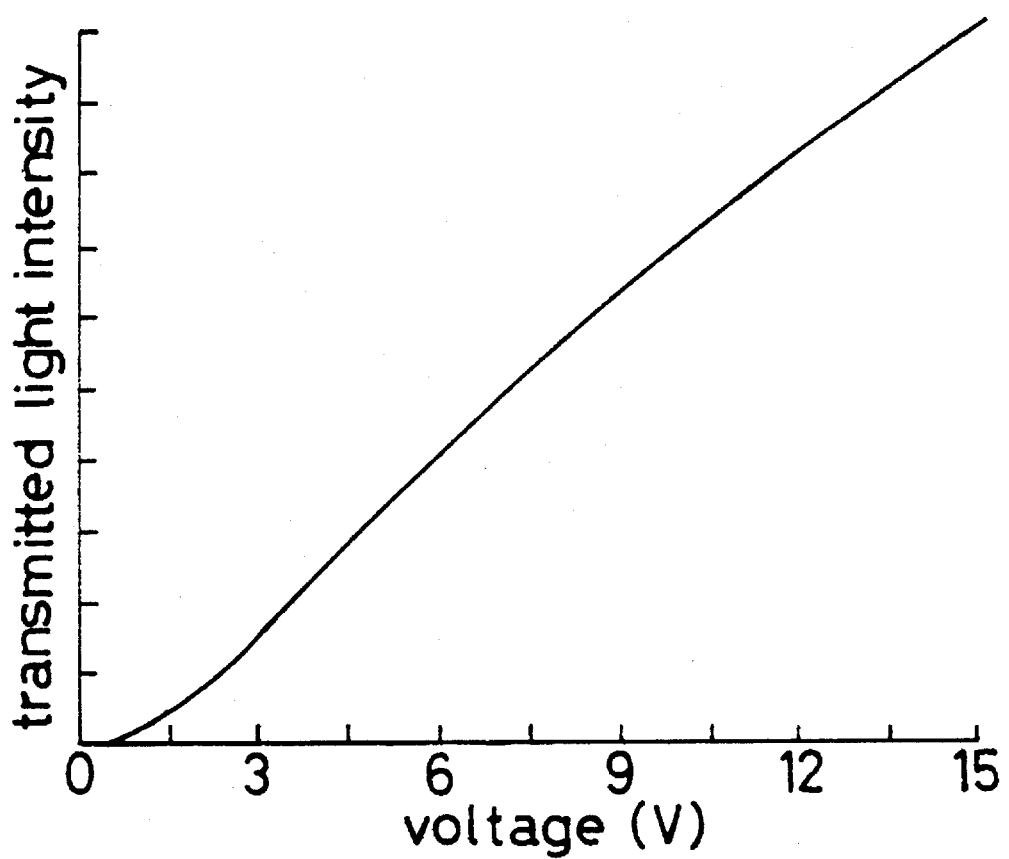
FIGS. 17 to 24 are characteristic charts showing an applied voltage and a transmitted light intensity according to the embodiment of the present invention.

The liquid crystal displays 1, 2 and 3 are provided between polarizing plates which are placed in the state of "cross nicol". An electric field is applied to cause the liquid crystal displays 1, 2 and 3 to take one of the stable states. The absorption shaft of the polarizing plate is caused to correspond to the extinction position of the liquid crystal display. In this state, a transmitted light intensity is measured while varying a voltage to apply a square wave voltage having a frequency of 60 Hz at a temperature of 28° C. The results of measurement are shown in FIGS. 15, 16 (*a*), 16 (*b*) and 17. Referring to the liquid crystal display 2, measurement is carried out by causing the absorption shaft of the polarizing plate to correspond to respective extinction positions in two stable states [see FIGS. 16 (*a*) and 16 (*b*)]. As seen from FIGS. 16 (*a*) and 16 (*b*), when the voltage is increased, the transmitted light intensity is continuously varied. By utilizing this characteristic, display with gray scale can be carried out. In FIGS. 16 (*a*) and 16 (*b*), the characteristics of a transmitted light intensity with respect to the voltages do not correspond to each other because there is the difference of stability between the two states. FIG. 16 (*a*) shows the case where the absorption shaft of the polarizing plate is caused to correspond to an extinction position having high stability. FIG. 16 (*b*) shows the case where the absorption shaft of the polarizing plate is caused to correspond to an extinction position having low stability. As compared with the change of the voltage, the transmitted light intensity is not rapidly changed. Consequently, the case shown in FIG. 16 (*a*) is suitable for the gradation display.

<Example 8>

The liquid crystal composition 1 of Table 4 is introduced into a cell having TFTs which is the same as in Example 4.

When a liquid crystal display having the TFT is driven by the driving method shown in Example 4, good infinite gradation can be displayed.

As shown in Table 5, the spontaneous polarization of each liquid crystal material has an absolute value of 1.5 nC/cm$^2$ or less at a room temperature. Consequently, C·Vmax>3·Ps·S can easily be satisfied. Also in this respect, a high retention can be realized at the time of active matrix driving.

While a bistable ferroelectric liquid crystal display is used, a monostable one may be used. In case where the monostable ferroelectric liquid crystal display is used, as shown in the following Example 9, more stable characteristics may easily be obtained.

If a color filter is combined, color display can be obtained.

<Example 9>

A liquid crystal display is prepared in the same manner as in Example 8 except that a liquid crystal composition 2 of Table 4 is used for a liquid crystal material and the absorption shaft of a polarizing plate is caused to correspond to an extinction position having high stability. There is omitted a second frame of a driving waveform (which serves to cancel the electric field of a first frame). Consequently, good infinite gradation can be displayed. The time for forming one screen is half of that of Example 8. In addition, it is not necessary to average a transmitted light intensity on the screen. As a result, good display can be obtained.

<Example 10>

Figure 18:
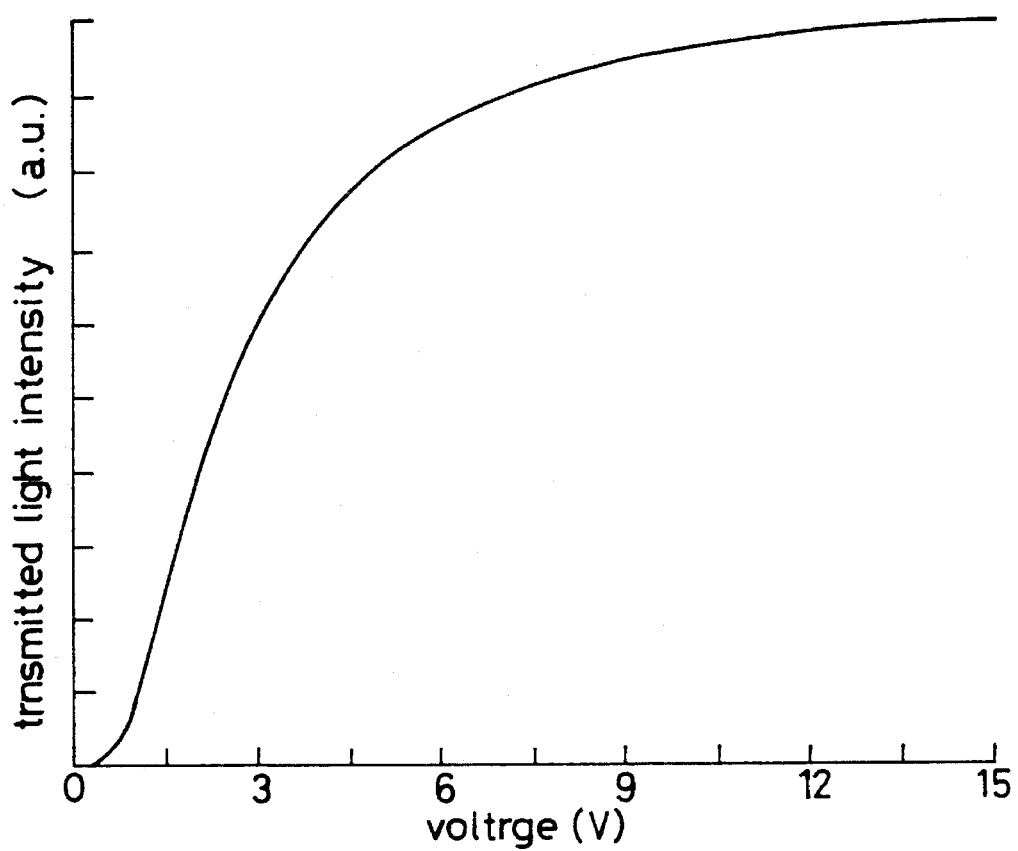

In Example 1, a composition 1 shown in Table 4 is used for a ferroelectric liquid crystal, and PSI-A-2001 (manufactured by Chisso Corporation) is used for an orientation film. When an insulating film is provided on only one of substrates, a ferroelectric liquid crystal cell has monostability. By using the ferroelectric liquid crystal cell, measurement is carried out in the same manner as in Example 3. As shown in FIG. 18, there can be obtained the same results as in Example 3. A liquid crystal material used in the present example is a fluorine liquid crystal material. For this reason, a high retention can be realized at the time of active matrix driving. In addition, since spontaneous polarization is −1.5 nC/cm$^2$, C·Vmax> 3·Ps·S can easily be satisfied. Also in this respect, the high retention can be realized at the time of active matrix driving.

<Example 11>

Figure 19:
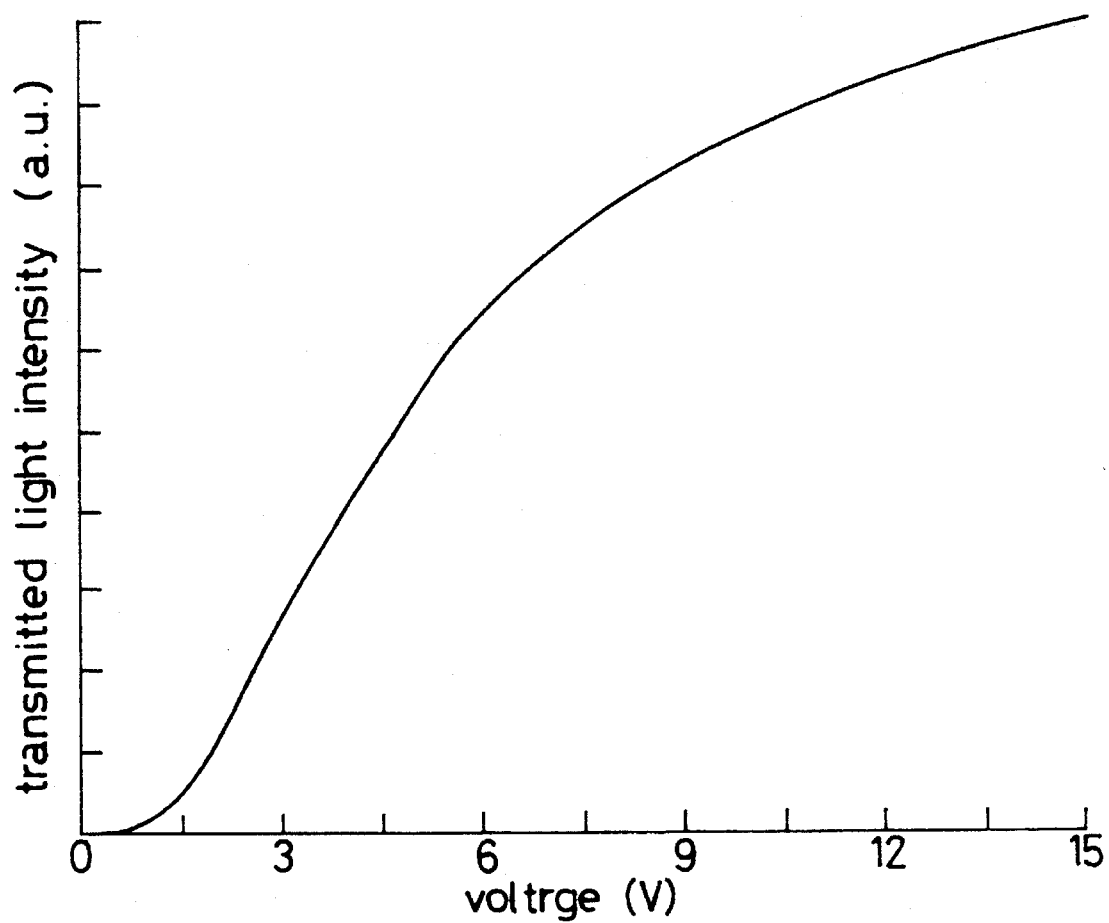

In Example 10, an applied voltage is set to a sine wave having a frequency of 60 Hz. As shown in FIG. 19, consequently, there can be obtained the same results as in Example 10.

<Example 12>

Figure 20:
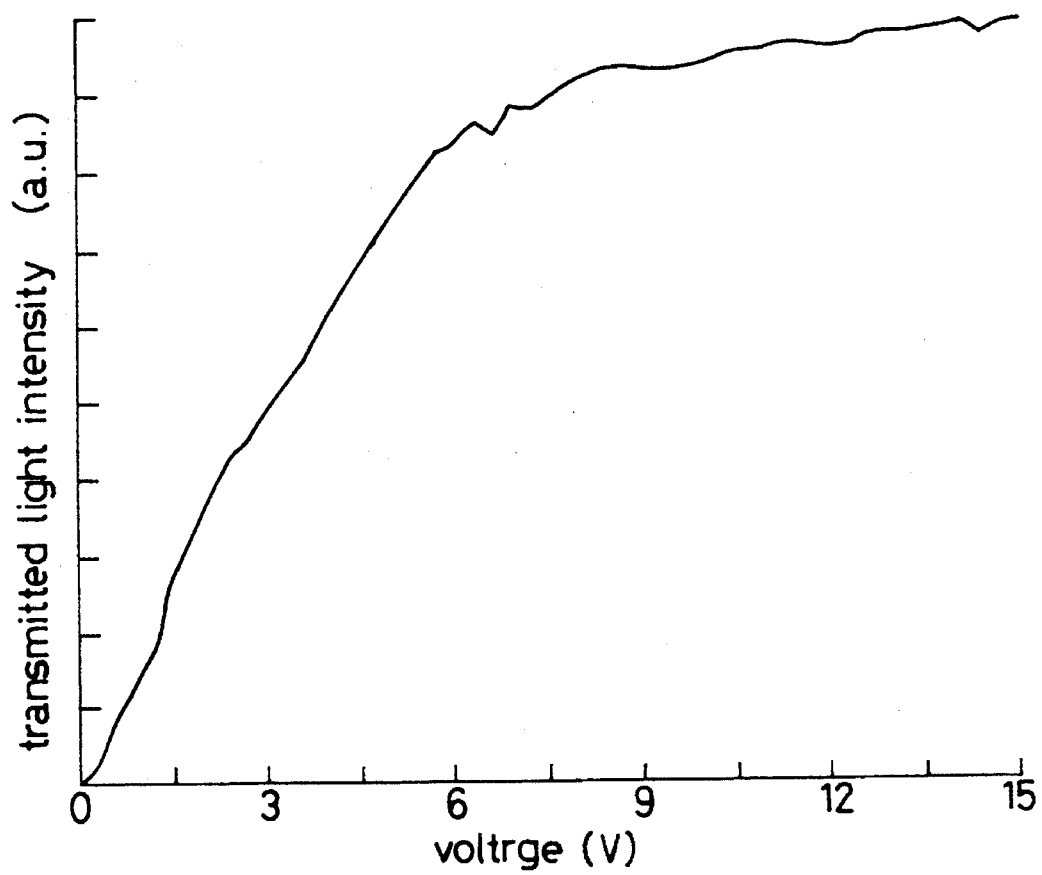

In Example 1, ZLI-5014-000 (manufactured by Merck Co., Ltd.) is used for a ferroelectric liquid crystal, and LX-1400 (manufactured by Hitachi Chemical Co., Ltd., Japan) is used for an orientation film. Only one of substrates is rubbed. In this example, the ferroelectric liquid crystal cell has bistability. By using the ferroelectric liquid crystal cell, measurement is carried out in the same manner as in Example 3. As shown in FIG. 20, there can be obtained the same results as in Example 3. Referring to ZLI-5014-000, spontaneous polarization is about −2.8 nC/cm$^2$ at a room temperature. Consequently, C·Vmax>3·Ps·S can easily be satisfied and a high retention can be realized at the time of active matrix driving.

<Example 13>

Figure 21:
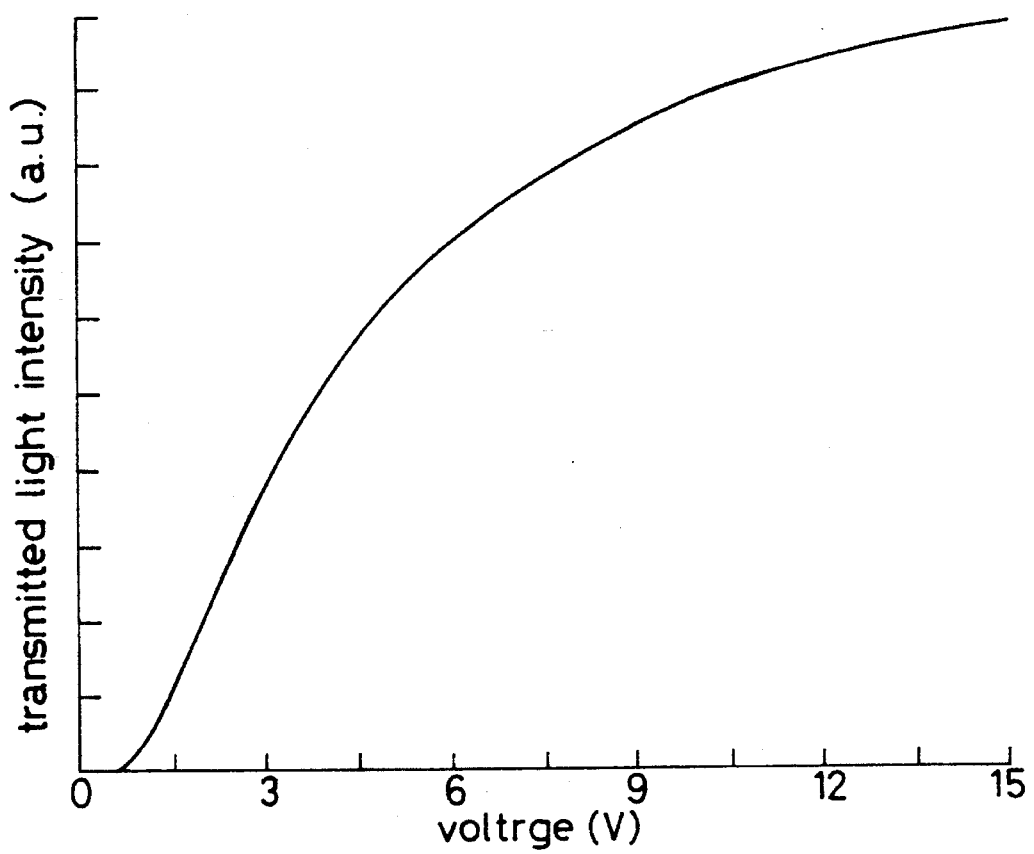

In Example 10, a composition 1 shown in Table 4 is used for a ferroelectric liquid crystal, and PSI-A-2101 (manufactured by Chisso Corporation) is used for an orientation film. An insulating film is provided on only one of substrates, which is then rubbed. In this example, the ferroelectric liquid crystal cell has monostability. By using the ferroelectric liquid crystal cell, measurement is carried out in the same manner as in Example 3. As shown in FIG. 21, consequently, there can be obtained the same results as in Example 3. A liquid crystal material used in the present example is a fluorine liquid crystal material. For this reason, a high retention can be realized at the time of active matrix driving. In addition, since spontaneous polarization is −1.5 nC/cm$^2$, C·Vmax>3·Ps·S can easily be satisfied. Also in this respect, the high retention can be realized at the time of active matrix driving.

There will be described the case where a ferroelectric liquid crystal is a short pitch ferroelectric liquid crystal.

<Example 14>

An insulating film is formed on a pair of glass substrates on which a patterned ITO film is provided. Nylon 6/6 is spin-coated. Only one of the glass substrates is rubbed. The glass substrates are stuck together to make a cell having a cell thickness of 1.2 μm. A short pitch ferroelectric liquid crystal, FLC-6480 (manufactured by Hoffman-La Roche) is vacuum-injected into the cell. The characteristics of this liquid crystal are shown in Table 6. Although the spiral pitch (0.48 μm) of the liquid crystal in a chiral smectic C phase is shorter than the space (1.2 μm) between the substrates, the spiral structure of the liquid crystal is loosened in the cell.

Figure 22:
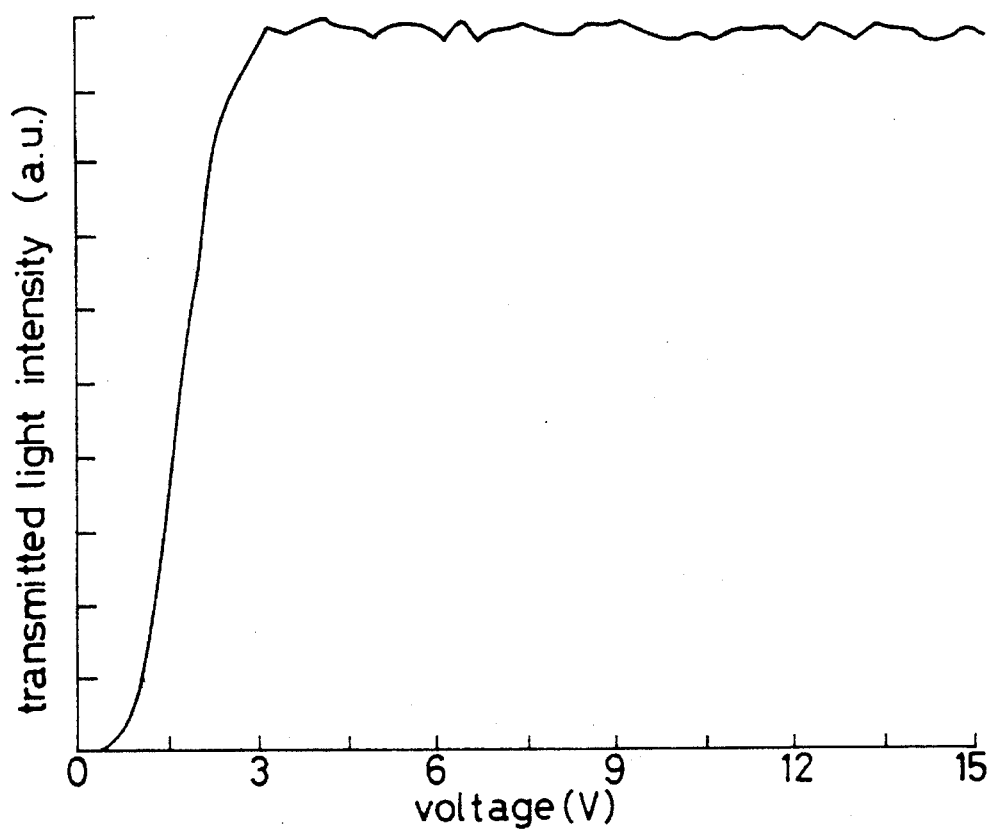

The ferroelectric liquid crystal cell thus prepared is set on a polarizing microscope. A transmitted light intensity is measured while applying a rectangular wave having a frequency of 60 Hz at a temperature of 20.5° C. Results are shown in FIG. 22. It is found that the transmitted light intensity is continuously changed according to a voltage.

In the darkest state, no voltage is applied. When no voltage is applied, the cell has uniform orientation. Consequently, the contrast ratio of the darkest state to the brightest state is about 20.

<Example 15>

Figure 23:
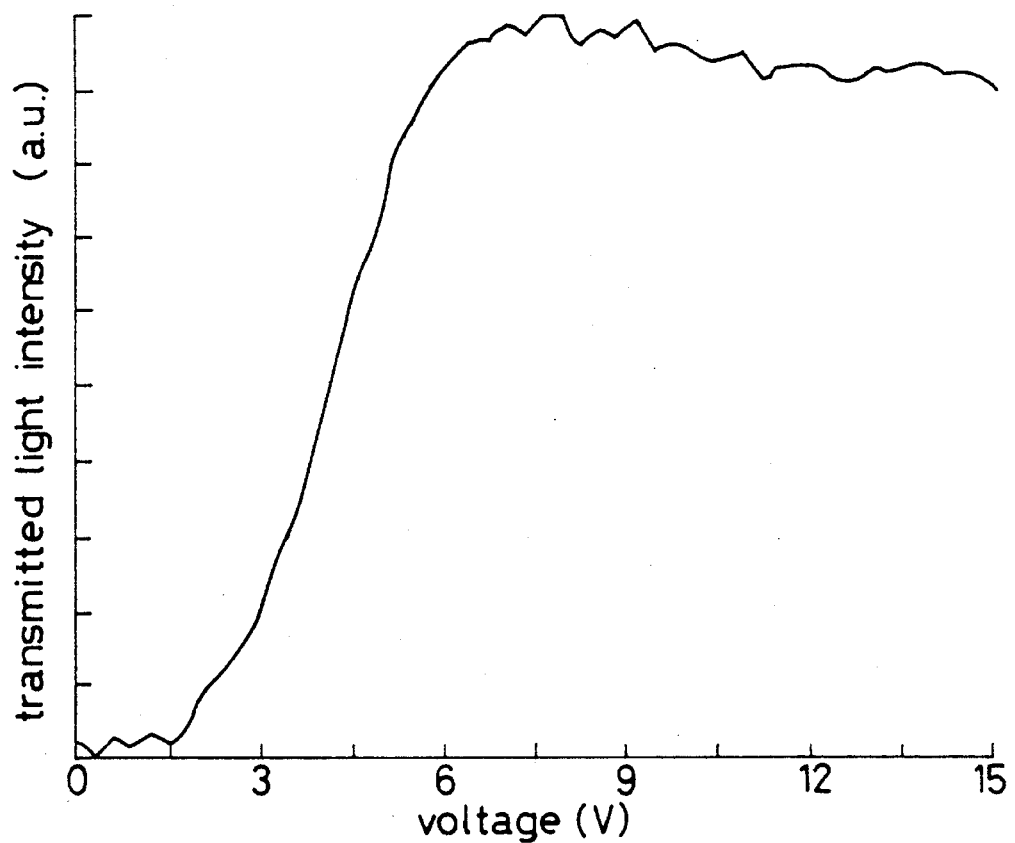

Also in case PSI-A-2101 (manufactured by Chisso Corporation) is used for an orientation film and a measuring temperature is 21.5° C. in Example 14, the same results can be obtained. FIG. 23 shows the dependence of a transmitted light intensity on a voltage obtained when applying a square wave voltage having a frequency of 60 Hz. It is found that the transmitted light intensity is continuously changed according to the voltage.

<Example 16>

Figure 24:
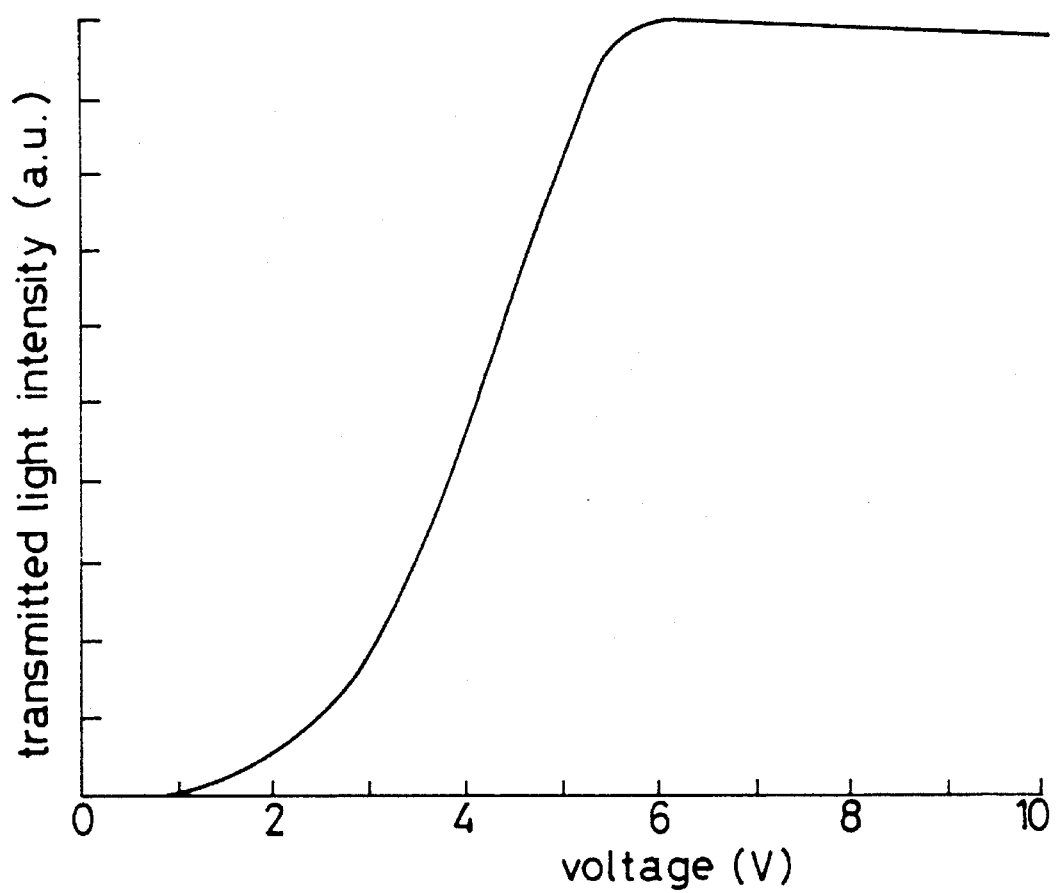

An insulating film is formed on a pair of glass substrates on which a patterned ITO film is provided. PSI-A-2101 (manufactured by Chisso Corporation) is spin-coated and rubbed on the insulating film. The glass substrates are stuck together to make a cell having a cell thickness of 1.2 μm in such a manner that their rubbing directions are almost antiparallel with each other. FLC-6430 (manufactured by Hoffman-La Roche) is vacuum-injected into the cell. FIG. 24 shows the dependence of a transmitted light intensity on a voltage obtained when applying a square wave voltage having a frequency of 60 Hz. It is found that the transmitted light intensity is continuously changed according to the voltage.

TABLE 6

Characteristics of FLC-6430

| | |
|---|---|
| Spontaneous Polarization | 90 nC/cm$^2$ |
| Spiral Pitch | 0.43 μm |
| Tilt Angle | 54° |
| Memory Angle | 46° |

<Example 17>

Figure 25:
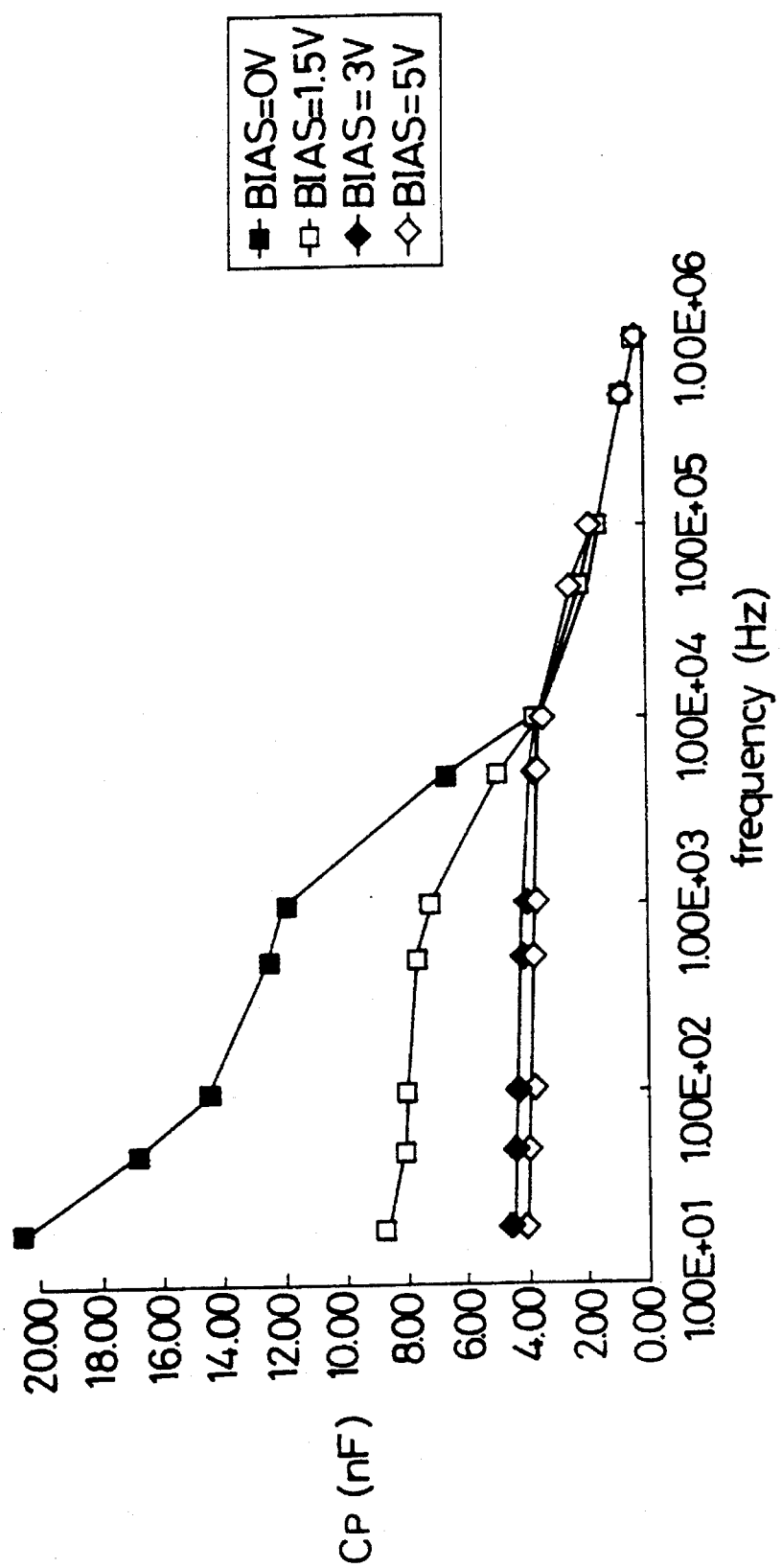
FIG. 25 is a graph showing the dependence of an electrostatic capacity of a liquid crystal cell on a frequency according to the embodiment of the present invention.
Figure 26A:
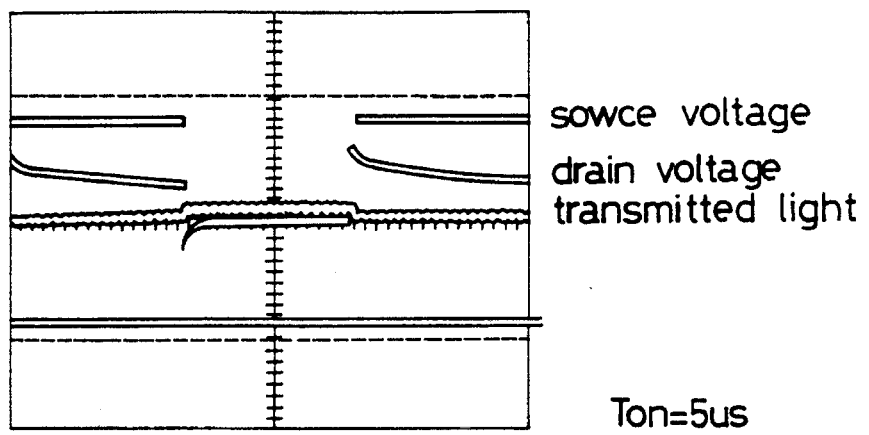
FIGS. 26 (a) to 26 (c) are graphs showing the transmitted light intensities vs a gate voltage, a source voltage and a drain voltage according to the embodiment of the present invention.
Figure 26B:
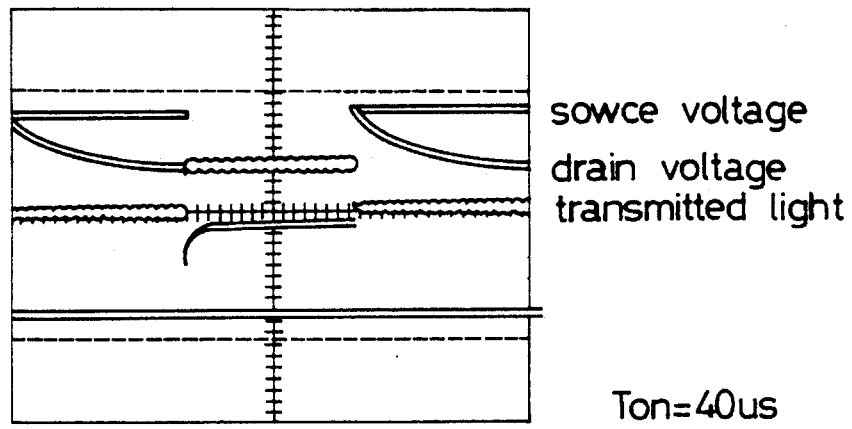
Figure 26C:
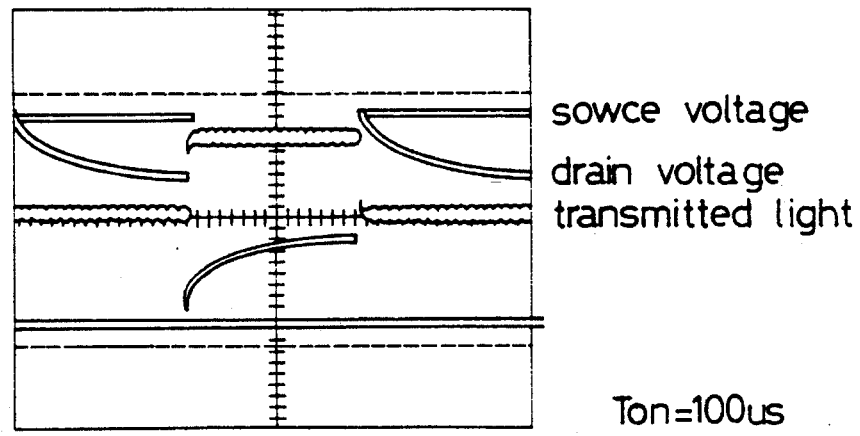
Figure 27:
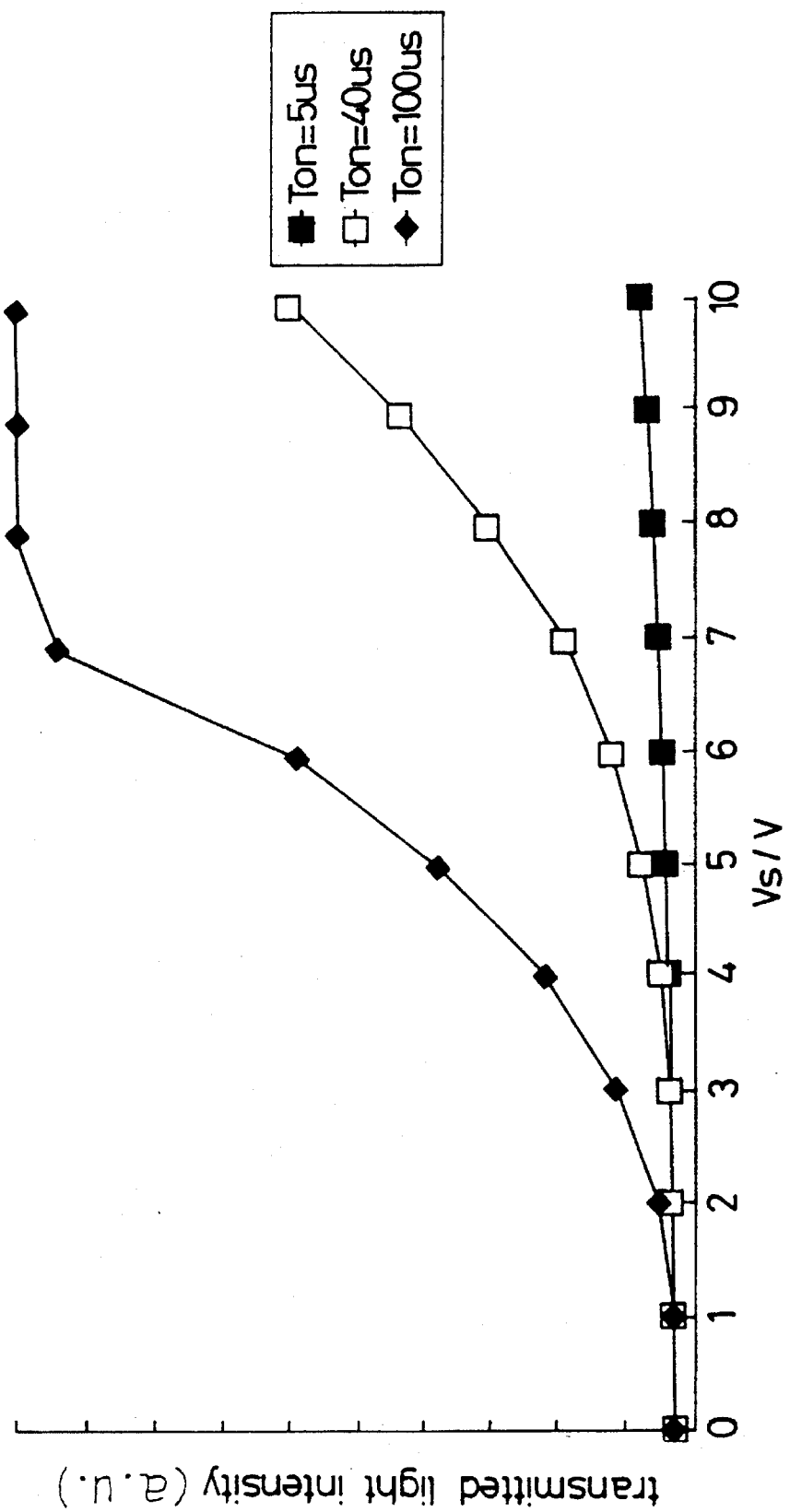
FIG. 27 is a graph showing the dependence of the transmitted light intensity on the source voltage according to the embodiment of the present invention.

The cell used in Example 14 is driven by a TFT in the same manner as in Example 4. FIG. 25 shows the dependence of an electrostatic capacity of the cell on a frequency. FIGS. 26 (a) to 26 (c) show a gate voltage, a source voltage, a drain voltage and a transmitted light intensity applied when changing a gate pulse width $T_{ON}$ for driving. In this case, a polarizing plate is arranged in such a manner that a state is brought into "dark" when applying a positive voltage. FIG. 27 shows the dependence of the transmitted light intensity on the source voltage. When the gate pulse width $T_{ON}$ is small, the drain voltage is greatly changed and the dependence of the transmitted light intensity on the source voltage is slight. However, the gate pulse width $T_{ON}$ is set to 100 μsecs, the change of the drain voltage is reduced and the dependence of the transmitted light intensity on the source voltage is enhanced.

C. Countermeasure against Flicker on Gradation Display

In a ferroelectric liquid crystal display, when the frequency of a liquid crystal applied alternating voltage is 40 Hz or less, the difference between transmitted light intensities obtained when applying positive and negative voltages is visually sensed as flickers.

However, by changing the polarity of voltages applied to liquid crystals every predetermined number of scanning and/or signal electrodes, the change of the transmitted light intensities are mutually canceled and averaged in adjacent scanning and/or signal electrode groups to which voltages having different polarity are applied. Consequently, the flickers are greatly reduced.

Figure 28:
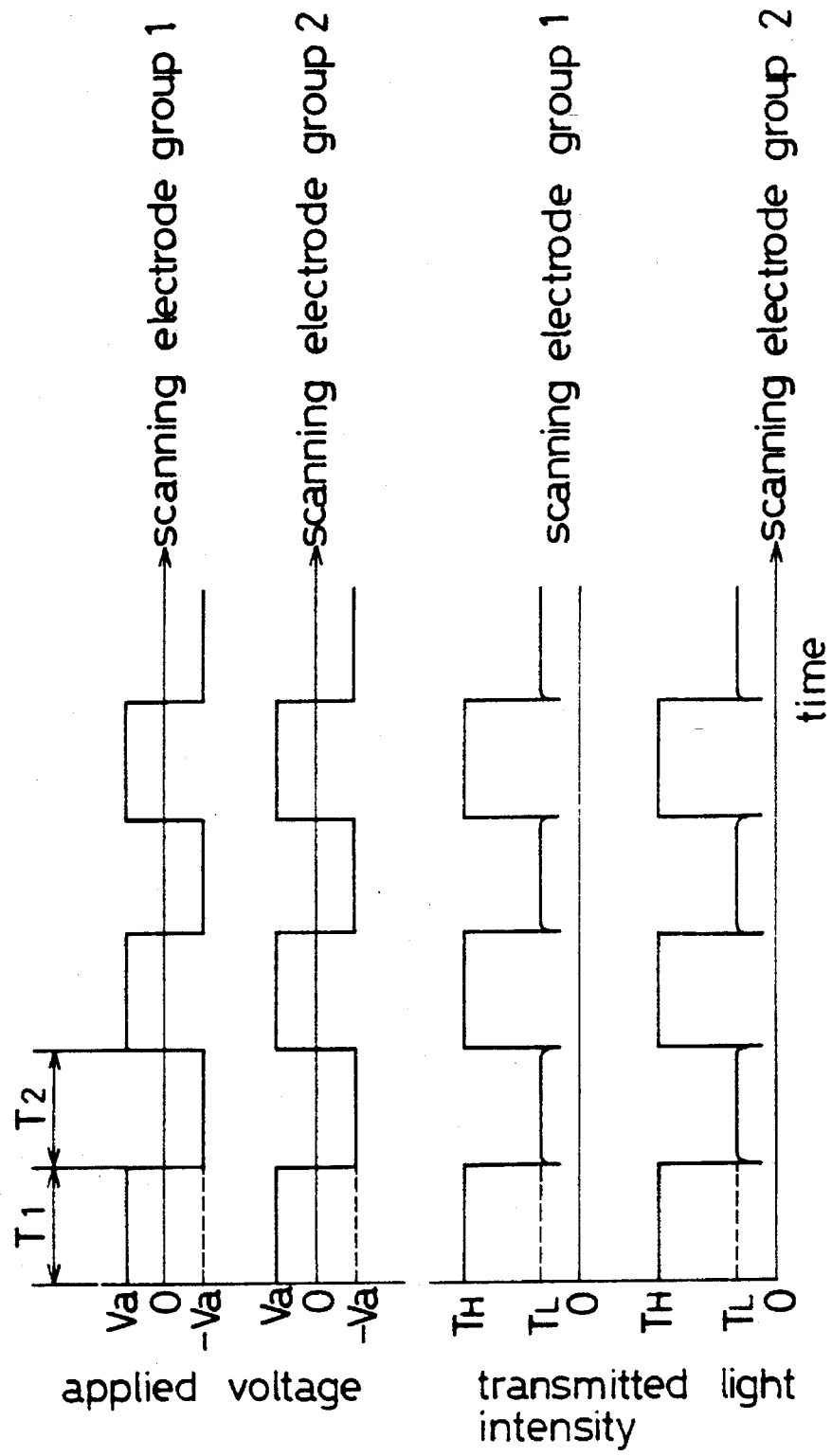
FIG. 28 is a waveform diagram for explaining a driving method according to the prior art.

In case the polarity of a voltage applied to a scanning electrode group 1 is the same as that of a voltage applied to a scanning electrode group 2 adjacent thereto, the scanning electrode groups 1 and 2 are in the state of "high transmission" for a period T1 and "low transmission" for a period T2 as shown in FIG. 28. For this reason, even though the scanning electrode groups 1 and 2 are simultaneously seen, the flickers are visually sensed when the frequency of the applied voltage is 40 Hz or less.

However, in case the polarity of the voltage applied to the scanning electrode group 1 is different from that of the voltage applied to the scanning electrode group 2, the scanning electrode group 2 is in the stake of "low transmission" for the period T1 and "high transmission" for the period T2 as shown in FIG. 29. For this reason, when the scanning electrode groups 1 and 2 are simultaneously seen, their transmitted light intensities are averaged. Accordingly, it is visually sensed that the average of the states of "low transmission $T_L$" and "high transmission $T_H$" is a transmitted light intensity $T_M$ for a period T1 to T2. Consequently, even though the frequency of the applied voltage is 40 Hz or less, there can be obtained display having no flicker. Also in case the display is seen in the oblique direction, only the values of $T_L$, $T_H$ and $T_M$ are varied so that flickers are not sensed.

<Example 18>

A ferroelectric liquid crystal is provided between a pair of substrates so as to fabricate a ferroelectric liquid crystal panel. The substrate has a plurality of scanning electrodes and a plurality of signal electrodes which are arranged so as to intersect each other. A pair of polarizing plates which are in the state of "cross nicol" are provided before and after the ferroelectric liquid crystal panel. The polarizing direction of the polarizing plate is caused to correspond to one of extinction positions when applying no electric field. ZLI-4237-000 (manufactured by Merck Co., Ltd.) is used for a ferroelectric liquid crystal, and PSI-A-E001 (manufactured by Chisso Corporation, Japan) is used for an orientation film.

Figure 30A:
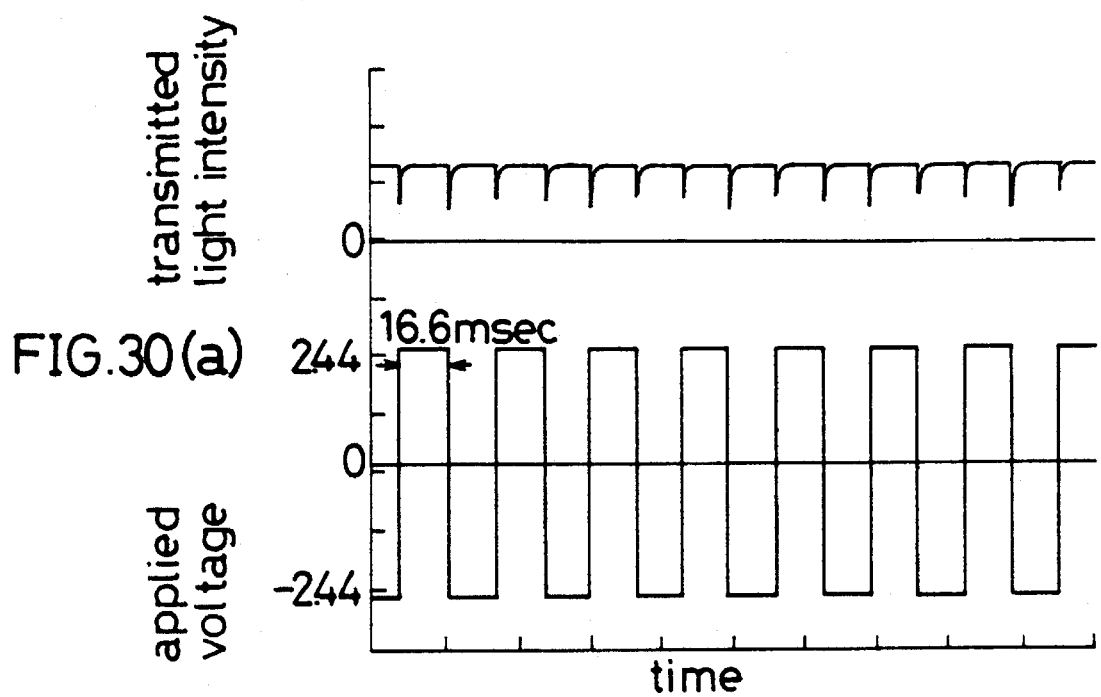
FIGS. 30 (a), 30 (b), 31 (a), 31 (b), 32 (a) and 32 (b) are waveform diagrams showing the change of an applied voltage and a transmitted light intensity according to the embodiment and comparative examples of the present invention.
Figure 30B:
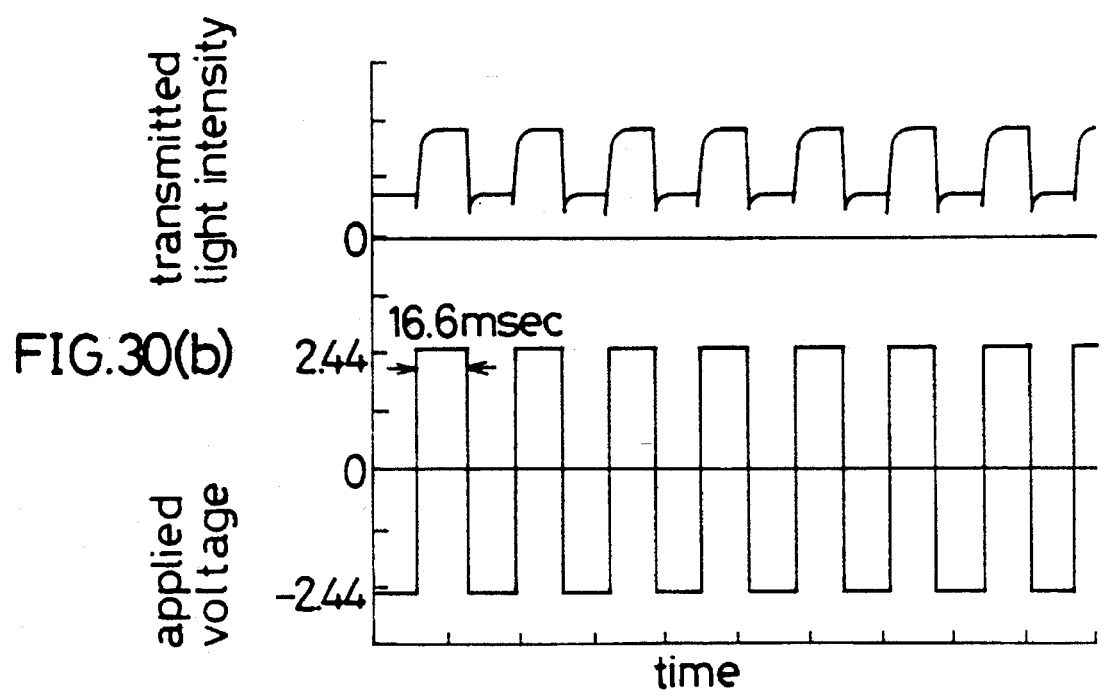

30 Hz square wave voltages of ±2.44 V are applied to the scanning and signal electrodes of the ferroelectric liquid crystal panel so as to measure the transmitted light intensities of about 6 scanning electrodes. FIG. 30 (b) shows the time change of the transmitted light intensity obtained by applying voltages having the same polarity to all scanning electrodes. It is found that the transmitted light intensity is varied synchronously with the cycle of the square wave voltage. At this time, flickers are clearly sensed visually. FIG. 30 (a) shows results obtained by applying voltages having different polarity every scanning electrode. The transmitted light intensity is seldom changed. At this time, the flickers are seldom sensed visually.

ZLI-4237-000 has spontaneous polarization of about −7.0 $nC/cm^2$ at a room temperature. Consequently, $C \cdot Vmax > 3 \cdot Ps \cdot S$ can easily be satisfied and a high retention can be realized at the time of active matrix driving.

<Example 19>

Figure 31A:
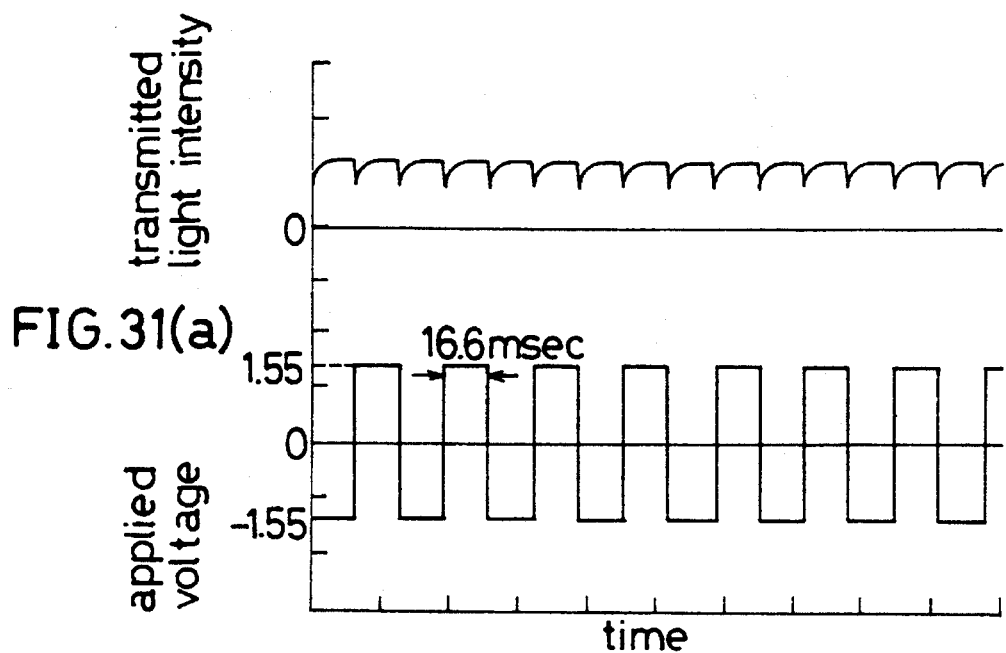
Figure 31B:
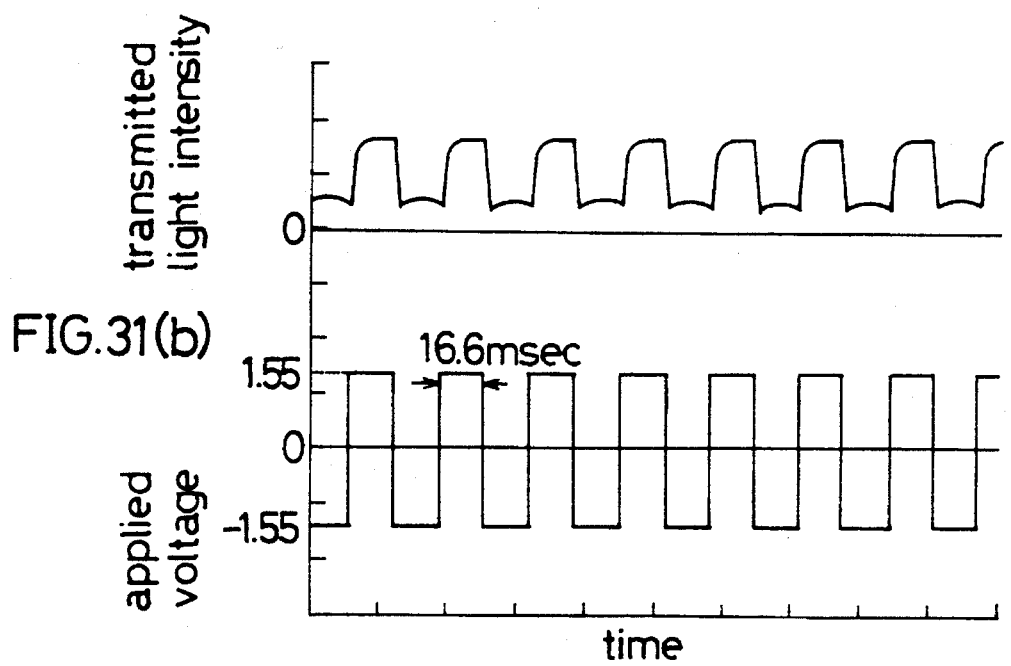

Also in case 30 Hz square wave voltages of ±1.55 V are applied in Example 18, there can be obtained the same results as in Example 18. FIG. 31 (b) shows the time change of a transmitted light intensity obtained by applying voltages having the same polarity to all scanning electrodes. FIG. 31 (a) shows the time change of the transmitted light intensity obtained by applying voltages having different polarity every scanning electrode.

<Example 20>

Figure 32A:
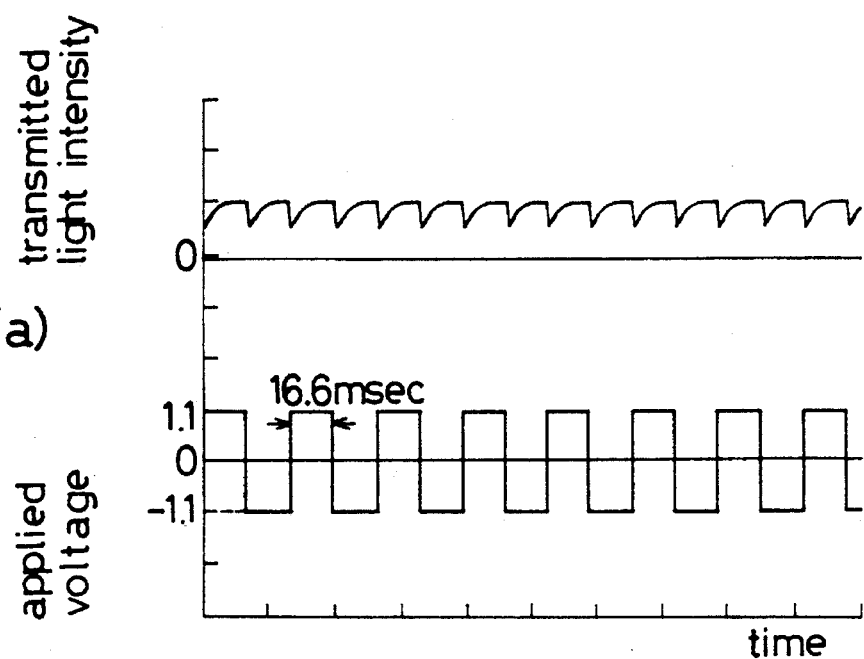
Figure 32B:
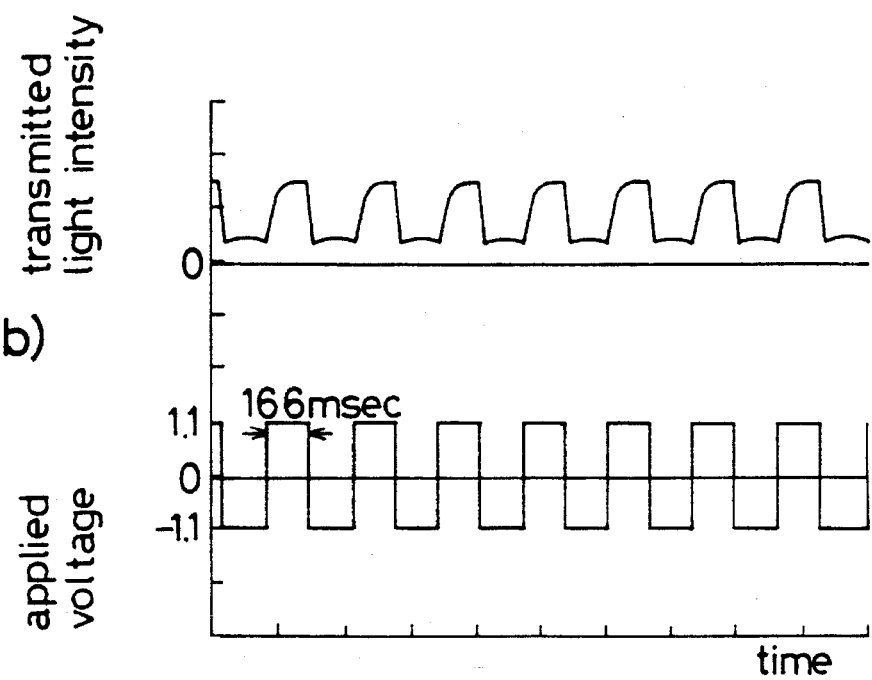

Also in case 30 Hz square wave voltages of ±1.1 V are applied in Example 18, there can be obtained the same results as in Example 18. FIG. 32 (b) shows the time change of a transmitted light intensity obtained by applying voltages having the same polarity to all scanning electrodes. FIG. 32 (a) shows the time change of the transmitted light intensity obtained by applying voltages having different polarity every scanning electrode.

<Example 21>

Figure 33:
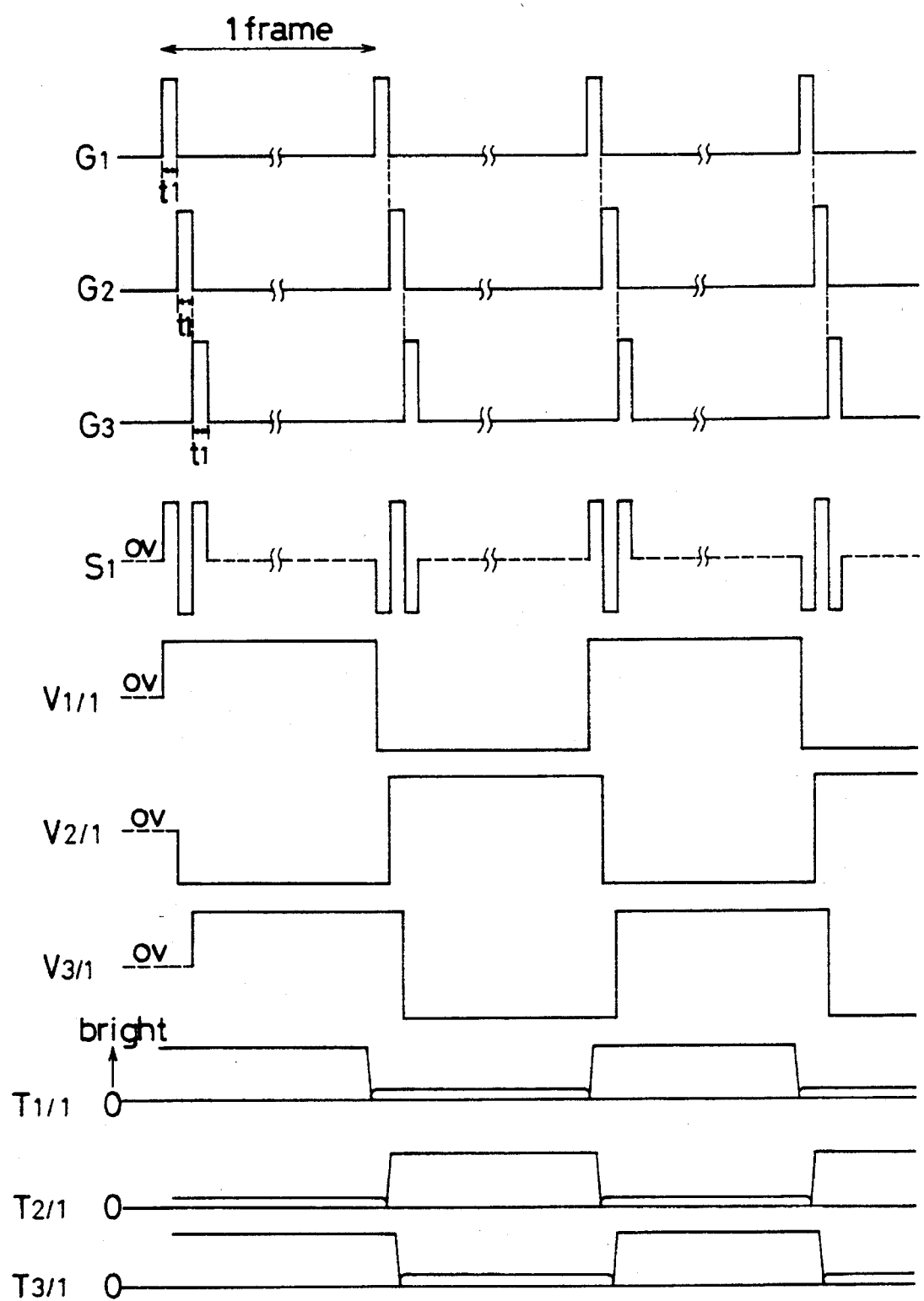
FIGS. 33 to 35 are waveform diagrams for explaining driving waveforms and the change of a transmitted light intensity according to the embodiment of the present invention.

FIG. 33 shows driving waveforms at the time of active matrix driving using the circuit shown in FIG. 11. In the present example, the polarity of an applied voltage is changed every time a scanning electrode is driven.

For a time t1, a signal is sent from a scanning electrode G1 to turn ON a TFT. Synchronously, zero or positive voltages corresponding to necessary display are applied from signal electrodes Si to Sk to pixels P1/1 to P1/k connected to the scanning electrode Gi.

For the next time t1, a signal is sent from a scanning electrode G2 to turn ON the TFT. Synchronously, signals are sent from the signal electrodes S1 to Sk. In this case, zero or negative voltages corresponding to necessary display are applied as the signals to be sent.

For the next time t1, a signal is sent from a scanning electrode G3 to turn ON the TFT. Synchronously, signals are sent from the signal electrodes. In this case, zero or positive voltages corresponding to necessary display are applied as the signals to be sent. In the same manner, the TFTs connected to the scanning electrodes are sequentially turned ON. A voltage corresponding to display is applied from the signal electrode while changing the polarity of the applied voltage every line.

After signals are sent from all scanning electrodes (one frame is completed), a signal is sent from the scanning electrode G1 to turn ON the TFT for the time t1 again. Synchronously, voltages corresponding to necessary display are applied from the signal electrodes S1 to Sk to the pixels P1/1 to P1/k connected to the scanning electrode G1.

In this case, the polarity of an applied voltage is made opposite to that of the applied voltage in a previous frame. In the present example, zero or negative voltages are applied. In the same manner, a signal is sent from the scanning electrode G2 to turn ON the TFT for the next time t1. Synchronously, zero or positive signals are sent from the signal electrodes S1 to Sk.

In the same manner, the TFTs connected to the scanning electrodes are sequentially turned ON. A voltage corresponding to display is applied from the signal electrode while changing the polarity of the applied voltage every line. FIG. 38 shows voltage waveforms applied to the pixels and the change of a transmitted light intensity.

Positive and negative voltages V1/1 having great values are alternately applied to the pixel P1/1 every frame. The display of the pixel P1/1 is brought into "white". A voltage V2/1 applied to a pixel P2/1 is an alternating voltage of which phase is different from that of the voltage V1/1 applied to the pixel P1/1 by about 180°. The phase of a voltage V3/1 applied to a pixel P3/1 is different from that of the voltage V2/1 applied to the pixel P2/1 by about 180°, and is almost the same as that of the voltage V1/1 applied to the pixel P1/1.

Also referring to the change of the transmitted light intensity, the phases of the pixels P3/1 and P2/1, or the pixels P2/1 and P1/1 are different from each other by about 180°. For this reason, when the pixels P3/1 and P2/1, or the pixels P2/1 and P1/1 are simultaneously seen, the time change of the transmitted light intensity is mutually canceled. Consequently, flickers are not sensed.

<Example 22>

Figure 34:
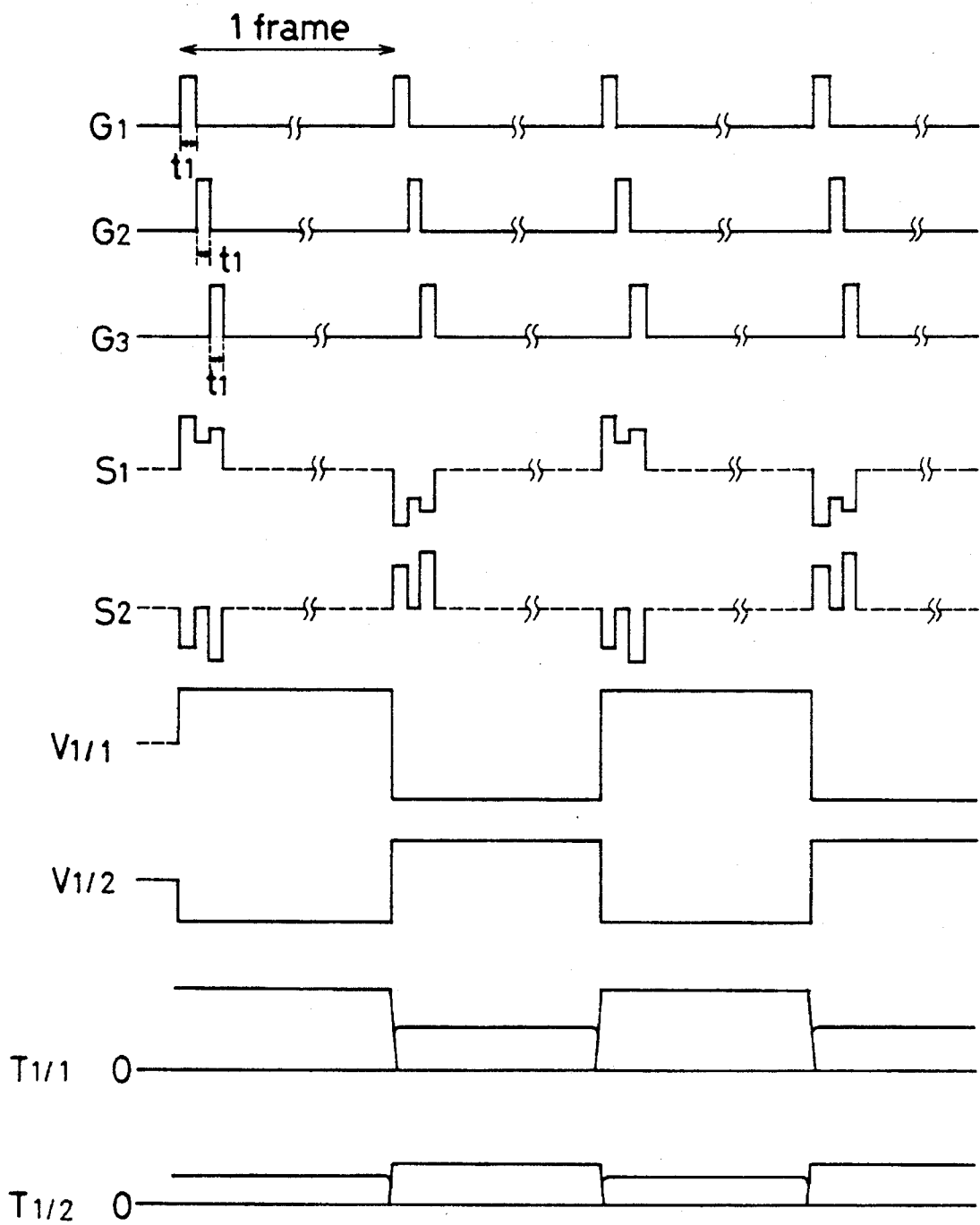

FIG. 34 shows other driving waveforms at the time of active matrix driving using a circuit shown in FIG. 11. For a time t1, a signal is sent from a scanning electrode G1 to turn ON a TFT. Synchronously, voltages corresponding to necessary display are applied from signal electrodes S1 to Sk to pixels P1/1 to P1/k connected to the scanning electrode G1. For the next time ti, a signal is sent from a scanning electrode G2 to turn ON the TFT. Synchronously, signals are sent from the signal electrodes S1 to Sk.

For the next time t1, a signal is sent from a scanning electrode G3 to turn ON the TFT. Synchronously, signals are sent from the signal electrodes S1 to Sk. In this case, the signs of voltages applied from the signal electrodes S1 to Sk are different from one another.

In FIG. 34, zero or positive voltages are applied from odd-numbered signal electrodes, and zero or negative voltages are applied from even-numbered signal electrodes. In the same manner, the TFTs connected to the scanning electrodes are sequentially turned ON to apply voltages corresponding to display from the signal electrodes.

After signals are sent from all scanning electrodes (one frame is completed), a signal is sent from the scanning electrode G1 to turn ON the TFT for the time t1 again. Synchronously, voltages corresponding to necessary display are applied from the signal electrodes S1 to Sk to the pixels P1/1 to P1/k connected to the scanning electrode G1.

For the next time t1, a signal is sent from the scanning electrode G2 to turn ON the TFT. Synchronously, signals are sent from the signal electrodes. In this case, the polarity of an applied voltage is made opposite to that of the applied voltage in a previous frame. In the present example, zero or negative voltages are applied from the odd-numbered signal electrodes, and zero or positive voltages are applied from the even-numbered signal electrodes.

In the same manner, the TFTs connected to the scanning electrodes are sequentially turned ON. Voltages corresponding to display are applied from the signal electrodes. FIG. 34 shows voltage waveforms applied to the pixels and the change of a transmitted light intensity. Positive and negative voltages V1/1 having great values are alternately applied to the pixel P1/1 every frame. The display of the pixel P1/1 is brought into "white". A voltage applied to a pixel P1/2 is an alternating voltage of which phase is different from that of the voltage applied to the pixel P1/1 by 180°. Also referring to the change of the transmitted light intensity, the phases of the pixels P1/2 and P1/1 are different from each other by 180°.

<Example 23>

Figure 35:
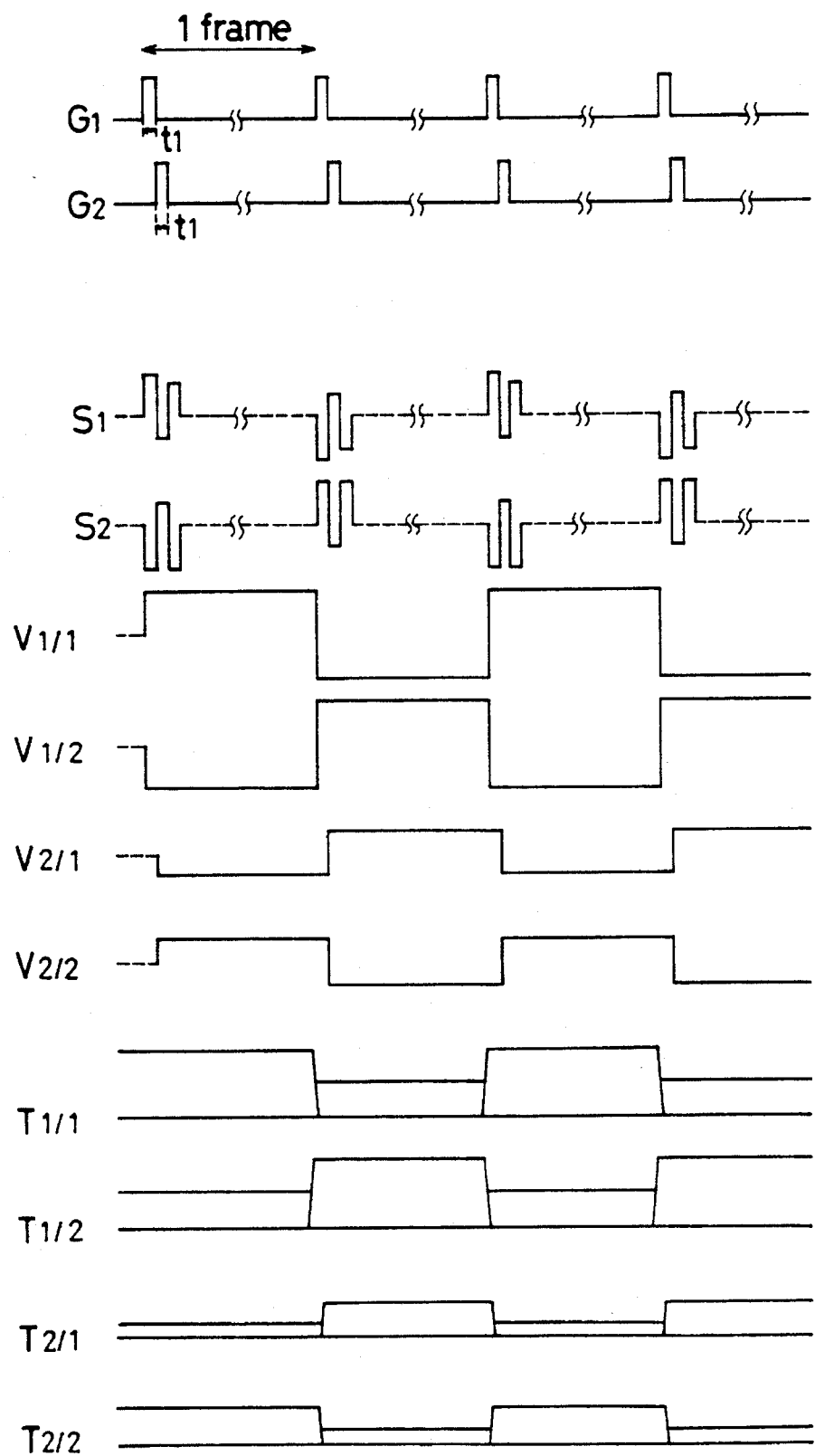

FIG. 35 shows other driving waveforms at the time of active matrix driving using a circuit shown in FIG. 11. For a time t1, a signal is sent from a scanning electrode G1 to turn ON a TFT.

Synchronously, voltages corresponding to necessary display are applied from signal electrodes S1 to Sk to pixels P1/1 to P1/k connected to the scanning electrode G1. For the next time t1, a signal is sent from a scanning electrode G2 to turn ON the TFT. Synchronously, signals are sent from the signal electrodes S1 to Sk.

For the next time t1, a signal is sent from a scanning electrode G3 to turn ON the TFT. Synchronously, signals are sent from the signal electrodes S1 to Sk. In this case, the signs of voltages applied from the signal electrodes S1 to Sk are different correspondingly to the pixels.

In the same manner, the TFTs connected to the scanning electrodes are sequentially turned ON to apply voltages corresponding to display from the signal electrodes S1 to Sk. After signals are sent from all scanning electrodes (one frame is completed), a signal is sent from the scanning electrode G1 to turn ON the TFT for the time t1 again. Synchronously, voltages corresponding to necessary display are applied from the signal electrodes S1 to Sk to the pixels P1/1 to P1/k connected to the scanning electrode G1. In the same manner, a signal is sent from the scanning electrode G2 to turn ON the TFT for the next time t1. Synchronously, signals are sent from the signal electrodes S1 to Sk. In this case, the polarity of an applied voltage is made opposite to that of the applied voltage in a previous frame.

In the same manner, the TFTs connected to the scanning electrodes are sequentially turned ON to apply voltages corresponding to display from the signal electrodes. FIG. 35 shows voltage waveforms V1/1, V1/2, V2/1 and V2/2 applied to the pixels, and transmitted light intensities T1/1, T1/2, T2/1 and T2/2.

<Example 24>

Also in case a composition 1 shown in Table 4 is used for a ferroelectric liquid crystal and PSI-A-2101 (manufactured by Chisso Corporation) is used for an orientation film in Examples 18 to 20, there can be obtained the same results as in Examples 18 to 20. Consequently, flickers can be controlled. A liquid crystal material is a fluorine liquid crystal material. For this reason, a high retention can be realized at the time of active matrix driving. In addition, since spontaneous polarization is about $-1.5$ nC/cm$^2$ at a room temperature, $C \cdot V_{max} > 3 \cdot P_s \cdot S$ can easily be satisfied. Also in this respect, the high retention can be realized at the time of active matrix driving.

<Example 25>

Also in case FLC-6430 (manufactured by Hoffman-La Roche), that is, a short pitch ferroelectric liquid crystal is used for a ferroelectric liquid crystal and PSI-A-2101 (manufactured by Chisso Corporation) is used for an orientation film in Example 24, there can be obtained the same results as in Examples 18 to 20. Consequently, flickers can be controlled.

According to the present invention, there can be realized the continuous gradation of a bistable liquid crystal display. Also in case a frame frequency is 60 Hz, that is, the frequency of a liquid crystal applied voltage is 30 Hz in a bistable or monostable ferroelectric liquid crystal display there can be realized continuous gradation display having no flicker. When active matrix driving is performed on a display panel by using the present method, there can be obtained a liquid crystal display having a large capacity, a great angle of visibility, high contrast and no flicker by which infinite gradation can be displayed.

What is claimed is:

1. A method for driving a liquid crystal display comprising, a liquid crystal cell including a pair of substrates, one of the substrates providing pixel electrodes arranged in a matrix, scanning and signal electrodes and active elements for active matrix control of the pixel electrodes and an orientation control layer thereon, the remaining substrate providing an opposite electrode and an orientation control layer thereon, and a ferroelectric liquid crystal filled in the cell, the ferroelectric liquid crystal being bistable in the cell; and a pair of polarizing plates provided in the state of "cross nicol" on both sides of the liquid crystal cell, the polarizing plates being oriented in such a manner that one of their polarizing directions is consistent with one of extinction positions of the ferroelectric liquid crystal under no electric field, comprising the steps of:

applying zero or positive voltages to the signal electrodes in synchronism to an ON operation of the active element responsive to a signal sent from the scanning electrode to form a first frame, and applying zero or negative voltages to the signal electrodes in synchronism to the ON operation of the active element to form a second frame, therewith controlling the magnitudes of the applied voltages to change an apparent tilt angle of the liquid crystal so that said apparent tilt angle assumes both positive and negative values, and combining the first and second frames sequentially to display an image with gray scale.

2. The method according to claim 1, wherein the ferroelectric liquid crystal contains at least one of compounds represented by the representative formula (1):

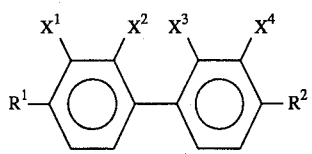

(where each of $R^1$ and $R^2$ denotes an alkyl or alkoxy group having a carbon number of 3 to 16 which is straight-chained or branched, and each of $X^1$, $X^2$, $X^3$ and $X^4$ denotes a hydrogen or halogen atom, at least one of which denotes a fluorine atom) or by the representative formula (2):

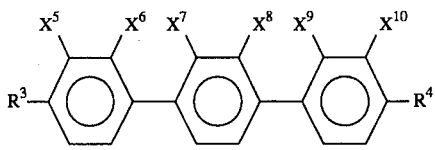

(where each of $R^3$ and $R^4$ denotes an alkyl or alkoxy group having a carbon number of 3 to 16 which is straight-chained or branched, and each of $X^5$, $X^6$, $X^7$, $X^8$, $X^9$ and $X^{10}$ denotes a hydrogen or halogen atom, at least one of which denotes a fluorine atom.)

3. The method according to claim 2, wherein the ferroelectric liquid crystal satisfies the following relationship:

$$C \cdot V_{max} > 3 \cdot P_s \cdot S$$

where C is an electrostatic capacity of each pixel provided with the pixel electrode; Vmax is a maximum voltage applied to the pixel through the active element; S is an area of the pixel; and Ps is an absolute value of the spontaneous polarization of the ferroelectric liquid crystal.

4. The method according to claim 3, wherein the absolute value Ps is 5 nC/cm$^2$ or less.

5. The method according to claim 1, wherein the ferroelectric liquid crystal is a short pitch ferroelectric liquid crystal having a spiral pitch shorter than a space between the substrates and a spiral structure to be loosened in the cell.

6. The method according to claim 1, wherein the ferroelectric liquid crystal satisfies the following relationship:

$$C \cdot V_{max} > 3 \cdot P_s \cdot S$$

where C is an electrostatic capacity of each pixel provided with the pixel electrode; Vmax is a maximum voltage applied to the pixel through the active element; S is an area of the pixel; and Ps is an absolute value of the spontaneous polarization of the ferroelectric liquid crystal.

7. The method according to claim 6, wherein the absolute value Ps is 5 nC/cm$^2$ or less.

8. A line sequential driving method for driving a liquid crystal display comprising:

a liquid crystal cell including a pair of substrates, one of the substrate providing scanning electrodes and an orientation control layer thereon, the remaining substrate providing signal electrodes and an orientation control layer thereon, and a ferroelectric liquid crystal filled between the substrates, and a pair of polarizing plates provided in the state of "cross nicol" on both sides of the liquid crystal cell, the polarizing plates being oriented in such a manner that one of their polarizing directions is consistent with one of extinction positions of the ferroelectric liquid crystal under no electric field, comprising the steps of:

applying a positive voltage or a negative voltage to a series of electrode groups each comprising a predetermined number of the scanning and/or signal electrodes so that the voltages applied to adjacent groups differ in polarity, to form a first frame, applying a voltage having polarity opposite to that in the first frame to each electrode group to form a second frame, therewith controlling magnitudes of the applied voltages to change an apparent tilt angle of the liquid crystal so that said apparent tilt angle assumes both positive and negative values, and combining the first and second frames sequentially to display an image with gray scale.

9. The method according to claim 8, wherein the predetermined number of scanning and/or signal electrodes indicate one scanning and/or signal electrode(s).

10. The method according to claim 8, wherein the frame is cyclically refreshed at 60 Hz.

11. The method according to claim 8, wherein the ferroelectric liquid crystal contains at least one of compounds represented by the representative formula (1):

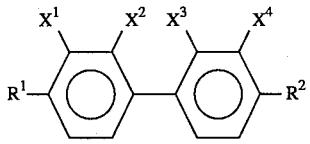

(where each of $R^1$ and $R^2$ denotes an alkyl or alkoxy group having a carbon number of 3 to 16 which is straight-chained or branched, and each of $X^1$, $X^2$, $X^3$ and $X^4$ denotes a hydrogen or halogen atom, at least one of which denotes a fluorine atom) or by the representative formula (2):

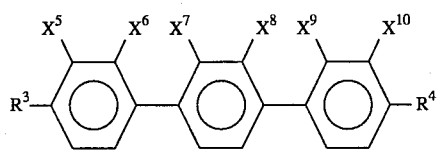

(where each of $R^3$ and $R^4$ denotes an alkyl or alkoxy group having a carbon number of 3 to 16 which is straight-chained or branched, and each of $X^5$, $X^6$, $X^7$, $X^8$, $X^9$ and $X^{10}$ denotes a hydrogen or halogen atom, at least one of which denotes a fluorine atom.)

12. The method according to claim 8, wherein the ferroelectric liquid crystal is a short pitch ferroelectric liquid crystal having a spiral pitch shorter than a space between the substrates and a spiral structure to be loosened in the cell.

13. A line sequence driving method for driving an active matrix type liquid crystal display comprising, a liquid crystal cell including a pair of substrates, one of the substrates providing pixel electrodes arranged in a matrix, scanning and signal electrodes and active elements for active matrix control of the pixel electrodes and an orientation control layer thereon, the remaining substrate providing an opposite electrode and an orientation control layer thereon, and a ferroelectric liquid crystal filled in the cell; and a pair of polarizing plates provided in the state of "cross nicol" on both sides of the liquid crystal cell, the polarizing plates being oriented in such a manner that one of their polarizing directions is consistent with one of extinction positions of the ferroelectric liquid crystal under no electric field, comprising the steps of:

applying a positive voltage or a negative voltage to a series of electrode groups each comprising a predetermined number of the scanning and/or signal electrodes so that the voltages applied to adjacent electrode groups differ in polarity, to form a first frame, applying a voltage having polarity opposite to that in the first frame to each electrode group to form a second frame, therewith controlling magnitudes of the applied voltages to change an apparent tilt angle of the liquid crystal so that said apparent tilt angle assumes both positive and negative values, and combining the first and second frames sequentially to display an image with gray scale.

14. The method according to claim 13, wherein the predetermined number of scanning and/or signal electrode indicates one scanning and/or signal electrode(s).

15. The method according to claim 13, wherein the frame is cyclically refreshed at 60 Hz.

16. The method according to claim 13, wherein the ferroelectric liquid crystal contains at least one of compounds represented by the representative formula (1):

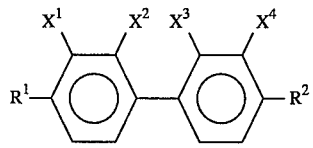

(where each of $R^1$ and $R^2$ denotes an alkyl or alkoxy group having a carbon number of 3 to 16 which is straight-chained or branched, and each of $X^1$, $X^2$, $X^3$ and $X^4$ denotes a hydrogen or halogen atom, at least one of which denotes a fluorine atom) or by the representative formula (2):

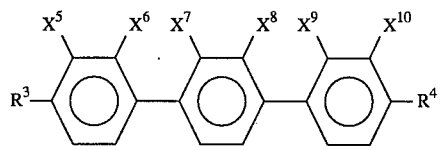

(where each of $R^3$ and $R^4$ denotes an alkyl or alkoxy group having a carbon number of 3 to 16 which is straight-chained or branched, and each of $X^5$, $X^6$, $X^7$, $X^8$, $X^9$ and $X^{10}$ denotes a hydrogen or halogen atom, at least one of which denotes a fluorine atom.)

17. The method according to claim 13, wherein the ferroelectric liquid crystal is a short pitch ferroelectric liquid crystal having a spiral pitch shorter than a space between the substrates and a spiral structure to be loosened in the cell.

18. The method according to claim 13, wherein the ferroelectric liquid crystal satisfies the following relationship:

$$C \cdot Vmax > 3 \cdot Ps \cdot S$$

where C is an electrostatic capacity of each pixel provided with the pixel electrode; Vmax is a maximum voltage applied to the pixel through the active element; S is an area of the pixel; and Ps is an absolute value of the spontaneous polarization of the ferroelectric liquid crystal.

19. The method according to claim 18, wherein the absolute value Ps is 5 nC/cm² or less.

20. A method for driving a liquid crystal display which comprises:

a liquid crystal cell including a pair of substrates each having an electrode film and an orientation control layer on each electrode film, and a pair of polarizing plates provided in the state of "cross nicol" on both sides of the liquid crystal cell; comprising the steps of:

providing a ferroelectric liquid crystal between the substrates, the ferroelectric liquid crystal showing bistable characteristics having two maximum apparent tilt angles ±Θ and two memory angles ±Θm, where Θ>Θm;

aligning one of polarizing directions of the polarizing plates with the angle Θm;

applying to the cell an alternating voltage having such a low frequency that an apparent tilt angle of the ferroelectric liquid crystal changes alternatively with respect to the angle Θm and synchronously with the alternating voltage thus having the apparent tilt angle assume both positive and negative values, and controlling a magnitude of the alternating voltage to change each intensity of light transmitted during a half cycle and the next half cycle, whereby an average intensity of light transmitted through the cell per cycle of the applied alternating voltage is controlled.

21. The method of claim 20, wherein the ferroelectric liquid crystal contains at least one of compounds represented by the representative formula (1):

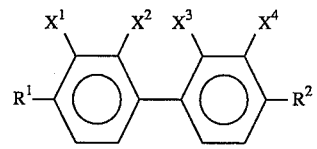

(where each of $R^1$ and $R^2$ denotes an alkyl or alkoxy group having a carbon number of 3 to 16 which is straight-chained or branched, and each of $X^1$, $X^2$, $X^3$ and $X^4$ denotes a hydrogen or halogen atom, at least one of which denotes a fluorine atom) or by the representative formula (2):

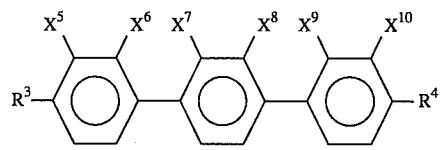

(where each of $R^3$ and $R^4$ denotes an alkyl or alkoxy group having a carbon number of 3 to 16 which is straight-chained or branched, and each of $X^5$, $X^6$, $X^7$, $X^8$, $X^9$ and $X^{10}$ denotes a hydrogen or halogen atom, at least one of which denotes a fluorine atom.)

22. The method of claim 20 in which the frequency of the alternating voltage is more than 10 Hz.

* * * * *